US012052692B2

United States Patent
Loehr et al.

(10) Patent No.: US 12,052,692 B2
(45) Date of Patent: *Jul. 30, 2024

(54) MULTIPLE PROSE GROUP COMMUNICATION DURING A SIDELINK CONTROL PERIOD

(71) Applicant: Panasonic Intellectual Property Corporation of America, Torrance, CA (US)

(72) Inventors: Joachim Loehr, Hessen (DE); Prateek Basu Mallick, Hessen (DE); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,358

(22) Filed: May 10, 2023

(65) Prior Publication Data
US 2023/0284184 A1 Sep. 7, 2023

Related U.S. Application Data

(63) Continuation of application No. 17/098,910, filed on Nov. 16, 2020, now Pat. No. 11,690,046, which is a
(Continued)

(51) Int. Cl.
*H04W 72/02* (2009.01)
*H04W 72/0453* (2023.01)
(Continued)

(52) U.S. Cl.
CPC ........ *H04W 72/02* (2013.01); *H04W 72/0453* (2013.01); *H04W 72/23* (2023.01); *H04W 76/14* (2018.02); *H04W 88/04* (2013.01)

(58) Field of Classification Search
None
See application file for complete search history.

(56) References Cited

U.S. PATENT DOCUMENTS 9,451,604 B2 * 9/2016 Xue ..................... H04L 1/1861
9,467,900 B2 * 10/2016 Xiong .................. H04W 28/16
(Continued)

FOREIGN PATENT DOCUMENTS

| CN | 103139764 A | 6/2013 |
| CN | 104429141 A | 3/2015 |
| WO | WO 2015021185 A1 | 2/2015 |

OTHER PUBLICATIONS

3GPP Organizational Partners "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.5.0, Mar. 2015, 251 pages.
(Continued)

*Primary Examiner* — Christopher T Wyllie
(74) *Attorney, Agent, or Firm* — Seed IP Law Group LLP

(57) ABSTRACT

A method allocates radio resources for a transmitting user equipment (UE) to perform direct communication transmissions over a direct sidelink connection to one or more receiving UEs. At least two sidelink grant processes are provided in the transmitting UE for the transmitting UE to handle at least two sidelink grants within the same transmission control period. Each one of the sidelink grant processes is associated with an identification and can be associated with one sidelink grant. The transmitting UE acquires at least two sidelink grants and associates each of the acquired sidelink grants with one sidelink grant process. For each sidelink grant, the transmitting UE allocates radio resources according to the respective sidelink grant to per-
(Continued)

form a direct communication transmission of sidelink control information and of data over the direct sidelink connection. The transmitting UE performs a direct communication transmission per acquired sidelink grant within the same transmission control period.

8 Claims, 12 Drawing Sheets

Related U.S. Application Data continuation of application No. 15/567,055, filed as application No. PCT/CN2015/076867 on Apr. 17, 2015, now Pat. No. 10,869,296.

(51) Int. Cl.
  *H04W 72/23* (2023.01)
  *H04W 76/14* (2018.01)
  *H04W 88/04* (2009.01)

(56) References Cited

U.S. PATENT DOCUMENTS

| | | | | |
|---|---|---|---|---|
| 10,278,158 | B2* | 4/2019 | Rudolf | H04W 72/04 |
| 10,743,293 | B2* | 8/2020 | Rudolf | H04W 88/02 |
| 2014/0080494 | A1* | 3/2014 | Lim | H04W 72/23 |
| | | | | 455/450 |
| 2015/0271846 | A1* | 9/2015 | Kowalski | H04W 72/23 |
| | | | | 370/329 |
| 2015/0382324 | A1* | 12/2015 | Sheng | H04W 72/02 |
| | | | | 370/329 |
| 2016/0081108 | A1* | 3/2016 | Tseng | H04W 72/569 |
| | | | | 370/329 |
| 2016/0095112 | A1* | 3/2016 | Panteleev | H04L 1/1614 |
| | | | | 370/329 |
| 2016/0100345 | A1* | 4/2016 | Thangarasa | H04L 5/00 |
| | | | | 370/332 |
| 2016/0128082 | A1* | 5/2016 | Chen | H04W 72/1221 |
| | | | | 370/329 |
| 2016/0219620 | A1* | 7/2016 | Lee | H04W 76/14 |
| 2017/0142741 | A1* | 5/2017 | Kaur | H04W 72/02 |
| 2017/0230939 | A1* | 8/2017 | Rudolf | H04L 12/1863 |
| 2017/0257876 | A1* | 9/2017 | Loehr | H04W 72/00 |
| 2017/0303240 | A1* | 10/2017 | Basu Mallick | H04W 72/02 |
| 2017/0303307 | A1* | 10/2017 | Xu | H04W 76/14 |
| 2017/0359835 | A1* | 12/2017 | Seo | H04B 7/2606 |
| 2018/0132254 | A1* | 5/2018 | Chae | H04W 72/02 |
| 2018/0263026 | A1* | 9/2018 | Loehr | H04W 72/02 |
| 2019/0053251 | A1* | 2/2019 | Loehr | H04W 72/1263 |

OTHER PUBLICATIONS

3GPP Organizational Partners "3rd Generation Partnership Project; Technical Specification Group Radio Access Network; Evolved Universal Terrestrial Radio Access (E-UTRA); Multiplexing and channel coding (Release 12)," 3GPP TS 36.212 V12.4.0, Mar. 2015, 94 pages.

3GPP Organizational Partners "3rd Generation Partnership Project; Technical Specification Group Services and System Aspects; Proximity-based services (ProSe); Stage 2 (Release 12)," 3GPP TS 23.303 V12.4.0, Mar. 2015, 63 pages.

3GPP Organizational Partners, "3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.5.0, Mar. 2015, 77 pages.

3GPP Organizational Partners, "3rd Generation Partnership Project; Technical Specification Group Radio Access Network; Evolved Universal Terrestrial Radio Access (E-UTRA); Physical layer procedures (Release 14)," 3GPP TS 36.213 V14.4.0, Sep. 2017, 462 pages.

3GPP Organizational Partners, "3rd Generation Partnership Project; Technical Specification Group Radio Access Network; Study on LTE Device to Device Proximity Services; Radio Aspects (Release 12)," 3GPP TR 36.843 V12.0.1, Mar. 2014, 50 pages.

3GPP Organizational Partners, "Evolved Universal Terrestrial Radio Access (E-UTRA); Physical channels and modulation (3GPP TS 36.211 version 8.8.0 Release 8)," ETSI TS 136 211 V8.8.0, Oct. 2009, 85 pages.

Ericsson, R2, "Introduction of ProSe," R2-145435, 3GPP TSG-RAN WG2 Meeting #88, San Francisco, USA, Nov. 17-21, 2014, 33 pages.

Extended European Search Report, dated Nov. 7, 2018, for corresponding European Application No. 15888829.7-1215 / 3284299, 9 pages.

Extended European Search Report, mailed Mar. 23, 2022, for European Application No. 21213187.4-1215 / 3986072, 5 pages.

International Search Report, dated Jan. 21, 2016, for corresponding International Application No. PCT/CN2015/076867, 2pages.

Japanese Office Action, dated Dec. 8, 2020, for Japanese Application No. 2019-168439, 5 pages. (with English translation).

LG Electronics, "Discussion on enhancements to D2D communication relay UEs," R1-151509, Agenda item: 7.2.3.2.1, 3GPP TSG RAN WG1 Meeting #80bis, Belgrade, Serbia, Apr. 20-24, 2015, 5 pages.

NTT DOCOMO, "Resource Allocation for UE-to-Network Relay," R1-151964, 3GPP TSG RAN WG1, Meeting #80bis, Agenda Item: 7.2.3.2.1, Belgrade, Serbia, Apr. 20-24, 2015, 4 pages.

\* cited by examiner

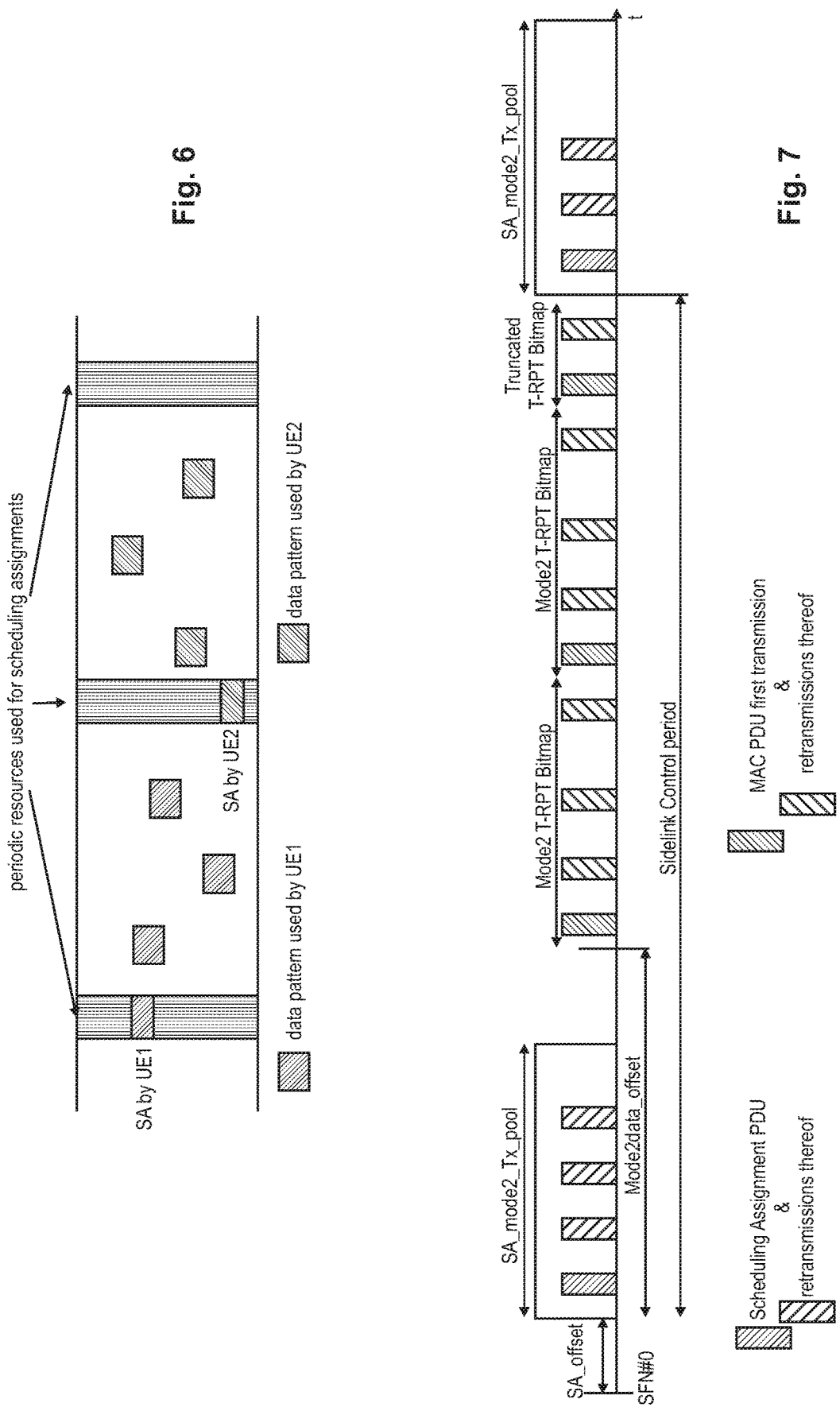

| Group index$_1$ | LCG ID$_1$ | Buffer Size$_1$ | Oct 1
| Buffer Size$_1$ | Group index$_2$ | | Oct 2
| LCG ID$_2$ | Buffer Size$_2$ | | Oct 3

...

| Group index$_{N-1}$ | LCG ID$_{N-1}$ | Buffer Size$_{N-1}$ | Oct 1.5*N-2
| Buffer Size$_{N-1}$ | Group index$_N$ | | Oct 1.5*N-1
| LCG ID$_N$ | Buffer Size$_N$ | | Oct 1.5*N

MULTIPLE PROSE GROUP COMMUNICATION DURING A SIDELINK CONTROL PERIOD

BACKGROUND

Technical Field

The present disclosure relates to methods for allocating radio resources to a transmitting user equipment to perform a direct communication transmission over a direct sidelink connection to one or more receiving user equipments. The present disclosure is also providing the user equipment and base station for participating in the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block." A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)," section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair," or equivalent "RB pair" or "PRB pair."

The term "component carrier" refers to a combination of several resource blocks in the frequency domain. In future releases of LTE, the term "component carrier" is no longer used; instead, the terminology is changed to "cell," which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

The characteristics of the downlink and uplink PCell are:
For each SCell the usage of uplink resources by the UE in addition to the downlink ones is configurable (the number of DL SCCs configured is therefore always larger or equal to the number of UL SCCs, and no SCell can be configured for usage of uplink resources only)
The downlink PCell cannot be de-activated, unlike SCells
Re-establishment is triggered when the downlink PCell experiences Rayleigh fading (RLF), not when downlink SCells experience RLF
Non-access stratum information is taken from the downlink PCell
PCell can only be changed with handover procedure (i.e., with security key change and RACH procedure)
PCell is used for transmission of PUCCH
The uplink PCell is used for transmission of Layer 1 uplink control information
From a UE viewpoint, each uplink resource only belongs to one serving cell The configuration and reconfiguration, as well as addition and removal, of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as 'DL anchor carrier.' Same applies also for the uplink.

When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and improved coverage (higher data rates for a given terminal peak power). During each time interval, Node B assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size BWgrant during one time interval, e.g., a subframe of 0.5 ms, onto which coded information bits are mapped. It should be noted that a subframe, also referred to as transmission time interval (TTI), is the smallest time interval for user data transmission. It is however possible to assign a frequency resource BWgrant over a longer time period than one TTI to a user by concatenation of subframes.

UL Scheduling Scheme for LTE

The uplink scheme in LTE allows for both scheduled access, i.e., controlled by eNB, and contention-based access.

In case of scheduled access, the UE is allocated by the eNB a certain frequency resource for a certain time (i.e., a time/frequency resource) for uplink data transmission. Some time/frequency resources can be allocated for contention-based access, within which the UEs can transmit without first being scheduled by the eNB. One scenario where UE is making a contention-based access is for example the random access, i.e., when UE is performing an initial access to a cell or for requesting uplink resources.

For the scheduled access the Node B scheduler assigns a user a unique frequency/time resource for uplink data transmission. More specifically the scheduler determines
which UE(s) is (are) allowed to transmit,
which physical channel resources,
Transport format (Modulation Coding Scheme, MCS) to be used by the mobile terminal for the transmission The allocation information is then signaled to the UE via a scheduling grant, sent on the L1/L2 control channel. For simplicity reasons this channel is called uplink grant channel in the following. Correspondingly, a scheduling grant message contains information which part of the frequency band the UE is allowed to use, the validity period of the grant, and the transport format the UE has to use for the upcoming uplink transmission. The shortest validity period is one sub-frame. Additional information may also be included in the grant message, depending on the selected scheme. Only "per UE" grants are used to grant the right to transmit on the UL-SCH (i.e., there are no "per UE per RB" grants). Therefore, the UE needs to distribute the allocated resources among the radio bearers according to some rules. Unlike in HSUPA, there is no UE-based transport format selection. The eNB decides the transport format based on some information, e.g., reported scheduling information and QoS info, and the UE has to follow the selected transport format. In HSUPA the Node B assigns the maximum uplink resource, and the UE selects accordingly the actual transport format for the data transmissions.

Since the scheduling of radio resources is the most important function in a shared-channel access network for determining Quality of Service, there are a number of requirements that should be fulfilled by the UL scheduling scheme for LTE in order to allow for an efficient QoS management.

Starvation of low priority services should be avoided

Clear QoS differentiation for radio bearers/services should be supported by the scheduling scheme The UL reporting should allow fine granular buffer reports (e.g., per radio bearer or per radio bearer group) in order to allow the eNB scheduler to identify for which Radio Bearer/service data is to be sent.

It should be possible to make clear QoS differentiation between services of different users It should be possible to provide a minimum bit rate per radio bearer As can be seen from above list, one essential aspect of the LTE scheduling scheme is to provide mechanisms with which the operator can control the partitioning of its aggregated cell capacity between the radio bearers of the different QoS classes. The QoS class of a radio bearer is identified by the QoS profile of the corresponding SAE bearer signaled from AGW to eNB as described before. An operator can then allocate a certain amount of its aggregated cell capacity to the aggregated traffic associated with radio bearers of a certain QoS class. The main goal of employing this class-based approach is to be able to differentiate the treatment of packets depending on the QoS class they belong to.

Layer 1/Layer 2 Control Signaling

In order to inform the scheduled users about their allocation status, transport format, and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH. Furthermore, 3GPP Release 11 introduced an EPDCCH that fulfills basically the same function as the PDCCH, i.e., conveys L1/L2 control signaling, even though the detailed transmission methods are different from the PDCCH. Further details can be found in the current versions of 3GPP TS 36.211 and 36.213, incorporated herein by reference. Consequently, most items outlined in the background and the embodiments apply to PDCCH as well as EPDCCH, or other means of conveying L1/L2 control signals, unless specifically noted.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (e.g., Resource Blocks, RBs) on which a user is allocated. Alternatively this information is termed resource block assignment (RBA). Note, that the number of RBs on which a user is allocated can be dynamic;

Carrier indicator, which is used if a control channel transmitted on a first carrier assigns resources that concern a second carrier, i.e., resources on a second carrier or resources related to a second carrier; (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding," section 5.3.3.1 (current version v12.4.0 available at http://www.3gpp.org and incorporated herein by reference). In addition, for further information regarding the DCI formats and the particular information that is transmitted in the DCI, please refer to the mentioned technical standard or to LTE—The UMTS Long Term Evolution—From Theory to Practice, Edited by Stefanie Sesia, Issam Toufik, Matthew Baker, Chapter 9.3, incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile terminal for contention-free random access (for all transmissions modes).

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation (transmission mode 4).

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: introduced in Release 11 and used for up to 8 layer transmissions; mainly used for COMP (Cooperative Multipoint) (transmission mode 10)

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

Format 5: DCI format 5 is used for the scheduling of the PSCCH (Physical Sidelink Control Channel), and also contains several SCI format 0 fields used for the scheduling of the PSSCH (Physical Sidelink Shared Control Channel). If the number of information bits in DCI format 5 mapped onto a given search space is less than the payload size of format 0 for scheduling the same serving cell, zeros shall be appended to format 5 until the payload size equals that of format 0 including any padding bits appended to format 0.

The 3GPP technical standard TS 36.212, current version 12.4.0, defines in subclause 5.4.3, incorporated herein by reference, control information for the sidelink; for detailed information on sidelink see later.

SCI may transport sidelink scheduling information for one destination ID. SCI Format 0 is defined for use for the scheduling of the PSSCH. The following information is transmitted by means of the SCI format 0:
  Frequency hopping flag—1 bit.
  Resource block assignment and hopping resource allocation
  Time resource pattern—7 bits.
  Modulation and coding scheme—5 bits
  Timing advance indication—11 bits
  Group destination ID—8 bits
  Logical Channel Prioritization, LCP, Procedure For the uplink the process by which a UE creates a MAC PDU to transmit using the allocated radio resources is fully standardized; this is designed to ensure that the UE satisfies the QoS of each configured radio bearer in a way which is optimal and consistent between different UE implementations. Based on the uplink transmission resource grant message signaled on the PDCCH, the UE has to decide on the amount of data for each logical channel to be included in the new MAC and, if necessary, also to allocate space for a MAC Control Element.

In constructing a MAC PDU with data from multiple logical channels, the simplest and most intuitive method is the absolute priority-based method, where the MAC PDU space is allocated to logical channels in decreasing order of logical channel priority. This is, data from the highest-priority logical channel are served first in the MAC PDU, followed by data from the next highest-priority logical channel, continuing until the MAC PDU space runs out. Although the absolute priority-based method is quite simple in terms of UE implementation, it sometimes leads to starvation of data from low-priority logical channels; starvation means that the data from the low-priority logical channels cannot be transmitted because the data from high-priority logical channels take up all the MAC PDU space.

In LTE, a Prioritized Bit Rate (PBR) is defined for each logical channel so as to transmit data in the order of importance but also to avoid starvation of data with lower priority. The PBR is the minimum data rate guaranteed for the logical channel. Even if the logical channel has low priority, at least a small amount of MAC PDU space is allocated to guarantee the PBR. Thus, the starvation problem can be avoided by using the PBR.

Constructing a MAC PDU with PBR consists of two rounds. In the first round, each logical channel is served in a decreasing order of logical channel priority, but the amount of data from each logical channel included in the MAC PDU is initially limited to the amount corresponding to the configured PBR value of the logical channel. After all logical channels have been served up to their PBR values, if there is room left in the MAC PDU, the second round is performed. In the second round, each logical channel is served again in decreasing order of priority. The major difference for the second round compared to the first round is that each logical channel of lower priority can be allocated with MAC PDU space only if all logical channels of higher priority have no more data to transmit.

A MAC PDU may include not only the MAC SDUs from each configured logical channel but also a MAC CE. Except for a Padding BSR, the MAC CE has a higher priority than a MAC SDU from the logical channels because it controls the operation of the MAC layer. Thus, when a MAC PDU is composed, the MAC CE, if it exists, is the first to be included, and the remaining space is used for MAC SDUs from the logical channels. Then, if additional space is left and it is large enough to include a BSR, a Padding BSR is triggered and included in the MAC PDU. The Logical Channel Prioritization (LCP) procedure is applied every time a new transmission is performed.

The Logical Channel Prioritization is standardized, e.g., in 3GPP TS 36.321 (current version v12.5.0) in subclause 5.4.3.1 incorporated herein by reference.

RRC controls the scheduling of uplink data by signaling for each logical channel:
  priority where an increasing priority value indicates a lower priority level,
  prioritisedBitRate which sets the Prioritized Bit Rate (PBR),
  bucketSizeDuration which sets the Bucket Size Duration (BSD).

The UE shall maintain a variable Bj for each logical channel j. Bj shall be initialized to zero when the related logical channel is established, and incremented by the product PBR×TTI duration for each TTI, where PBR is the Prioritized Bit Rate of logical channel j. However, the value of Bj can never exceed the bucket size, and if the value of Bj is larger than the bucket size of logical channel j, it shall be set to the bucket size. The bucket size of a logical channel is equal to PBR×BSD, where PBR and BSD are configured by upper layers.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market and will, at the same time, serve the urgent needs of several Public Safety communities that are jointly committed to LTE.

Device-to-Device (D2D) communication is a technology component for LTE-Rel.12. The Device-to-Device (D2D) communication technology allows D2D as an underlay to the cellular network to increase the spectral efficiency. For example, if the cellular network is LTE, all data carrying physical channels use SC-FDMA for D2D signaling. In D2D communications, user equipments transmit data signals to each other over a direct link using the cellular resources instead of through the radio base station. Throughout the invention the terms "D2D," "ProSe" and "sidelink" are interchangeable.

D2D Communication in LTE

The D2D communication in LTE is focusing on two areas: Discovery and Communication.

ProSe (Proximity based Services) Direct Discovery is defined as the procedure used by the ProSe-enabled UE to discover other ProSe-enabled UE(s) in its proximity using E-UTRA direct radio signals via the PC5 interface. FIG. 3 schematically illustrates a PC5 interface for device-to-device direct discovery. FIG. 4 schematically illustrates a Radio Protocol Stack (AS) for ProSe Direct Discovery.

In D2D communication UEs transmit data signals to each other over a direct link using the cellular resources instead of through the base station (BS). D2D users communicate directly while remaining controlled under the BS, i.e., at least when being in coverage of an eNB. Therefore, D2D can improve system performances by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

With respect to the User plane protocols, in the following part of the agreement from D2D communication perspective is given (see also 3GPP TR 36.843 current version 12.0.1 section 9.2.2, incorporated herein by reference):
  PDCP:
    1:M D2D broadcast communication data (i.e., IP packets) should be handled as the normal user-plane data.
    Header-compression/decompression in PDCP is applicable for 1:M D2D broadcast communication.
      U-Mode is used for header compression in PDCP for D2D broadcast operation for public safety;
  RLC:
    RLC UM is used for 1:M D2D broadcast communication.
    Segmentation and Re-assembly is supported on L2 by RLC UM.
    A receiving UE needs to maintain at least one RLC UM entity per transmitting peer UE.
    An RLC UM receiver entity does not need to be configured prior to reception of the first RLC UM data unit.
    So far no need has been identified for RLC AM or RLC TM for D2D communication for user plane data transmission.
  MAC:
    No HARQ feedback is assumed for 1:M D2D broadcast communication
    The receiving UE needs to know a source ID in order to identify the receiver RLC UM entity.
    The MAC header comprises a L2 target ID which allows filtering out packets at MAC layer.
    The L2 target ID may be a broadcast, group cast or unicast address.
      L2 Groupcast/Unicast: A L2 target ID carried in the MAC header would allow discarding a received RLC UM PDU even before delivering it to the RLC receiver entity.
      L2 Broadcast: A receiving UE would process all received RLC PDUs from all transmitters and aim to re-assemble and deliver IP packets to upper layers.
    MAC sub header contains LCIDs (to differentiate multiple logical channels).
    At least Multiplexing/de-multiplexing, priority handling and padding are useful for D2D.
  ProSe Direct Communication Related Identities
    3GPP TS 36.300 current version 12.5.0 defines in subclause 8.3 the following identities to use for ProSe Direct Communication:
      SL-RNTI: Unique identification used for ProSe Direct Communication Scheduling;
      Source Layer-2 ID: Identifies the sender of the data in sidelink ProSe Direct Communication. The Source Layer-2 ID is 24 bits long and is used together with ProSe Layer-2 Destination ID and LCID for identification of the RLC UM entity and PDCP entity in the receiver;

Destination Layer-2 ID: Identifies the target of the data in sidelink ProSe Direct Communication. The Destination Layer-2 ID is 24 bits long and is split in the MAC layer into two bit strings:

One bit string is the LSB part (8 bits) of Destination Layer-2 ID and forwarded to physical layer as Sidelink Control Layer-1 ID. This identifies the target of the intended data in Sidelink Control and is used for filtering of packets at the physical layer.

Second bit string is the MSB part (16 bits) of the Destination Layer-2 ID and is carried within the MAC header. This is used for filtering of packets at the MAC layer.

No Access Stratum signaling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer.

Radio Resource Allocation for Proximity Services

From the perspective of a transmitting UE, a Proximity-Services-enabled UE (ProSe-enabled UE) can operate in two modes for resource allocation:

Mode 1 refers to the eNB-scheduled resource allocation, where the UE requests transmission resources from the eNB (or Release-10 relay node), and the eNodeB (or Release-10 relay node) in turn schedules the resources used by a UE to transmit direct data and direct control information (e.g., Scheduling Assignment). The UE needs to be RRC_CONNECTED in order to transmit data. In particular, the UE sends a scheduling request (D-SR or Random Access) to the eNB followed by a buffer status report (BSR) in the usual manner (see also following chapter "Transmission procedure for D2D communication"). Based on the BSR, the eNB can determine that the UE has data for a ProSe Direct Communication transmission and can estimate the resources needed for transmission.

On the other hand, Mode 2 refers to the UE-autonomous resource selection, where a UE on its own selects resources (time and frequency) from resource pool(s) to transmit direct data and direct control information (i.e., SA). One resource pool is defined, e.g., by the content of SIB18, namely by the field commTxPoolNormalCommon, this particular resource pool being broadcast in the cell and then commonly available for all UEs in the cell still in RRC_Idle state. Effectively, the eNB may define up to four different instances of said pool, respectively four resource pools for the transmission of SA messages and direct data. However, a UE shall always use the first resource pool defined in the list, even if it was configured with multiple resource pools.

As an alternative, another resource pool can be defined by the eNB and signaled in SIB18, namely by using the field commTxPoolExceptional, which can be used by the UEs in exceptional cases.

What resource allocation mode a UE is going to use is configurable by the eNB. Furthermore, what resource allocation mode a UE is going to use for D2D data communication may also depend on the RRC state, i.e., RRC_IDLE or RRC_CONNECTED, and the coverage state of the UE, i.e., in-coverage, out-of-coverage. A UE is considered in-coverage if it has a serving cell (i.e., the UE is RRC_CONNECTED or is camping on a cell in RRC_IDLE).

The following rules with respect to the resource allocation mode apply for the UE:

If the UE is out-of-coverage, it can only use Mode 2;

If the UE is in-coverage, it may use Mode 1 if the eNB configures it accordingly;

If the UE is in-coverage, it may use Mode 2 if the eNB configures it accordingly;

When there are no exceptional conditions, UE may change from Mode 1 to Mode 2 or vice-versa only if it is configured by eNB to do so. If the UE is in-coverage, it shall use only the mode indicated by eNB configuration unless one of the exceptional cases occurs;

The UE considers itself to be in exceptional conditions, e.g., while T311 or T301 is running;

When an exceptional case occurs the UE is allowed to use Mode 2 temporarily even though it was configured to use Mode 1.

While being in the coverage area of an E-UTRA cell, the UE shall perform ProSe Direct Communication Transmission on the UL carrier only on the resources assigned by that cell, even if resources of that carrier have been pre-configured, e.g., in UICC (Universal Integrated Circuit Card).

For UEs in RRC_IDLE the eNB may select one of the following options:

The eNB may provide a Mode 2 transmission resource pool in SIB. UEs that are authorized for ProSe Direct Communication use these resources for ProSe Direct Communication in RRC_IDLE;

The eNB may indicate in SIB that it supports D2D but does not provide resources for ProSe Direct Communication. UEs need to enter RRC_CONNECTED to perform ProSe Direct Communication transmission.

For UEs in RRC_CONNECTED:

A UE in RRC_CONNECTED that is authorized to perform ProSe Direct Communication transmission, indicates to the eNB that it wants to perform ProSe Direct Communication transmissions when it needs to perform a ProSe Direct Communication transmission;

The eNB validates whether the UE in RRC_CONNECTED is authorized for ProSe Direct Communication transmission using the UE context received from the MME;

The eNB may configure a UE in RRC_CONNECTED by dedicated signaling with a Mode-2 resource allocation transmission resource pool that may be used without constraints while the UE is RRC_CONNECTED. Alternatively, the eNB may configure a UE in RRC_CONNECTED by dedicated signaling with a Mode 2 resource allocation transmission resource pool which the UE is allowed to use only in exceptional cases and to rely on Mode 1 otherwise.

The resource pool for Scheduling Assignment when the UE is out-of-coverage can be configured as below:

The resource pool used for reception is pre-configured.

The resource pool used for transmission is pre-configured.

The resource pool for Scheduling Assignment when the UE is in coverage can be configured as below:

The resource pool used for reception is configured by the eNB via RRC, in dedicated or broadcast signaling.

The resource pool used for transmission is configured by the eNB via RRC if Mode 2 resource allocation is used The SCI (Sidelink Control Information) resource pool (also referred to as Scheduling Assignment, SA, resource pool) used for transmission is not known to the UE if Mode 1 resource allocation is used.

The eNB schedules the specific resource(s) to use for Sidelink Control Information (Scheduling Assignment) transmission if Mode 1 resource allocation is used. The specific resource assigned by the eNB is within the resource pool for reception of SCI that is provided to the UE.

FIG. 5 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, in the current state-of-the-art, it uses the corresponding resources only for the corresponding transmission/reception. For example, in FIG. 5 the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 5 can be used for LTE (overlay) transmissions and/or reception.

Transmission Procedure for D2D Communication

The D2D data transmission procedure differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e., resource pool) are provided; this may be done, e.g., with the exchange of the D2D communication Interest Indication by the UE and the corresponding response, D2D Communication Response, where the corresponding exemplary Prose-CommConfig information element mentioned above would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;
Step 2: eNB grants UL resource (for UE to send BSR) via PDCCH, scrambled by C-RNTI;
Step 3: UE sends D2D BSR indicating the buffer status via PUSCH;
Step 4: eNB grants D2D resource (for UE to send data) via PDCCH, scrambled by D2D-RNTI.
Step 5: D2D Tx UE transmits SA/D2D data according to grant received in step 4.

A Scheduling Assignment (SA), also termed SCI (Sidelink Control Information) is a compact (low-payload) message containing control information, e.g., pointer(s) to time-frequency resources, modulation and coding scheme and Group Destination ID for the corresponding D2D data transmission. An SCI transport the sidelink scheduling information for one (ProSE) destination ID. The content of the SA (SCI) is basically in accordance with the grant received in Step 4 above. The D2D grant and SA content (i.e., SCI content) are defined in the 3GPP technical standard 36.212, current version 12.4.0, subclause 5.4.3, incorporated herein by reference, defining in particular the SCI format 0 as mentioned before in this background section.

On the other hand, for Mode 2 resource allocation, above steps 1-4 are basically not necessary, and the UE autonomously selects resources for the SA and D2D data transmission from the transmission resource pool(s) configured and provided by the eNB.

FIG. 6 exemplarily illustrates the transmission of the Scheduling Assignment and the D2D data for two UEs, UE-A and UE-B, where the resources for sending the scheduling assignments are periodic, and the resources used for the D2D data transmission are indicated by the corresponding Scheduling Assignment.

FIG. 7 illustrates the D2D communication timing for Mode 2, autonomous scheduling, during one SA/data period, also known as SC period, Sidelink Control period. FIG. 8 illustrates the D2D communication timing for Mode 1, eNB-scheduled allocation during one SA/data period. A SC period is the time period consisting of transmission of a Scheduling Assignment and its corresponding data. As can be seen from FIG. 7, the UE transmits after an SA-offset time, a Scheduling Assignment using the transmission pool resources for scheduling assignments for Mode 2, SA_Mode2_Tx_pool. The 1st transmission of the SA is followed, e.g., by three retransmissions of the same SA message. Then, the UE starts the D2D data transmission, i.e., more in particular the T-RPT bitmap/pattern, at some configured offset (Mode2data_offset) after the first subframe of the SA resource pool (given by the SA_offset). One D2D data transmission of a MAC PDU consists of its 1st transmissions and several retransmissions. For the illustration of FIG. 7 (and of FIG. 8) it is assumed that three retransmissions are performed (i.e., 2nd, 3rd, and 4th transmission of the same MAC PDU). The Mode2 T-RPT Bitmap (time resource pattern of transmission (T-RPT)) basically defines the timing of the MAC PDU transmission (1st transmission) and its retransmissions (2nd, 3rd, and 4th transmission).

During one SA/data period, the UE can transmit multiple transport blocks (only one per subframe (TTI), i.e., one after the other), however to only one ProSe destination group. Also the retransmissions of one transport block must be finished before the first transmission of the next transport block starts, i.e., only one HARQ process is used for the transmission of the multiple transport blocks.

As apparent from FIG. 8, for the eNB-scheduled resource allocation mode (Mode 1), the D2D data transmission, i.e., more in particular the T-RPT pattern/bitmap, starts in the next UL subframe after the last SA transmission repetition in the SA resource pool. As explained already for FIG. 7, the Mode1 T-RPT Bitmap (time resource pattern of transmission (T-RPT)) basically defines the timing of the MAC PDU transmission (1st transmission) and its retransmissions (2nd, 3rd, and 4th transmission).

ProSe Network Architecture and ProSe Entities

FIG. 9 illustrates a high-level exemplary architecture for a non-roaming case, including different ProSe applications in the respective UEs A and B, as well as a ProSe Application Server and ProSe function in the network. The example architecture of FIG. 9 is taken from TS 23.303 v.12.4.0 chapter 4.2 "Architectural Reference Model" incorporated herein by reference.

The functional entities are presented and explained in detail in TS 23.303 subclause 4.4 "Functional Entities" incorporated herein by reference. The ProSe function is the logical function that is used for network-related actions required for ProSe and plays different roles for each of the features of ProSe. The ProSe function is part of the 3GPP's EPC and provides all relevant network services like authorization, authentication, data handling etc. related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with necessary parameters in order to use ProSe Direct Discovery and ProSe Direct Communication.

The term "UE" used in said connection refers to a ProSe-enabled UE supporting ProSe functionality, such as:

Exchange of ProSe control information between ProSe-enabled UE and the ProSe Function over PC3 reference point.

Procedures for open ProSe Direct Discovery of other ProSe-enabled UEs over PC5 reference point.

Procedures for one-to-many ProSe Direct Communication over PC5 reference point.

Procedures to act as a ProSe UE-to-Network Relay. The Remote UE communicates with the ProSe UE-to-Network Relay over PC5 reference point. The ProSe UE-to Network Relay uses layer-3 packet forwarding.

Exchange of control information between ProSe UEs over PC5 reference point, e.g., for UE-to-Network Relay detection and ProSe Direct Discovery.

Exchange of ProSe control information between another ProSe-enabled UE and the ProSe Function over PC3 reference point. In the ProSe UE-to-Network Relay case the Remote UE will send this control information over PC5 user plane to be relayed over the LTE-Uu interface towards the ProSe Function.

Configuration of parameters (e.g., including IP addresses, ProSe Layer-2 Group IDs, Group security material, radio resource parameters). These parameters can be pre-configured in the UE, or, if in coverage, provisioned by signaling over the PC3 reference point to the ProSe Function in the network.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via PC2 reference point.

UE Coverage States for D2D

As already mentioned before, the resource allocation method for D2D communication depends apart from the RRC state, i.e., RRC_IDLE and RRC_CONNECTED, also on the coverage state of the UE, i.e., in-coverage, out-of-coverage. A UE is considered in-coverage if it has a serving cell (i.e., the UE is RRC_CONNECTED or is camping on a cell in RRC_IDLE).

The two coverage states mentioned so far, i.e., in-coverage (IC) and out-of-coverage (OOC), are further distinguished into sub-states for D2D. FIG. 10 shows the four different states a D2D UE can be associated to, which can be summarized as follows:

State 1: UE1 has uplink and downlink coverage. In this state the network controls each D2D communication session. Furthermore, the network configures whether UE1 should use resource allocation Mode 1 or Mode 2.

State 2: UE2 has downlink but no uplink coverage, i.e., only DL coverage. The network broadcasts a (contention-based) resource pool. In this state the transmitting UE selects the resources used for SA and data from a resource pool configured by the network; resource allocation is only possible according to Mode 2 for D2D communication in such a state.

State 3: Since UE3 has no uplink and downlink coverage, the UE3 is, strictly speaking, already considered as out-of-coverage (OOC). However, UE3 is in the coverage of some UEs which are themselves (e.g., UE1) in the coverage of the cell, i.e., those UEs can be also referred as CP-relay UEs. Therefore, the area of the state-3 UEs in FIG. 10 can be denoted as CP UE-relay coverage area. UEs in this state 3 are also referred to as OOC-state-3 UEs. In this state the UEs receive some cell specific information which is sent by the eNB (SIB) and forwarded by the CP UE-relay UEs in the coverage of the cell via PD2DSCH to the OOC-state-3 UEs. A (contention-based) network-controlled resource pool is signaled by PD2DSCH.

State 4: UE4 is out of coverage and does not receive PD2DSCH from other UEs which are in the coverage of a cell. In this state, which is also referred to as state-4 OOC, the transmitting UE selects the resources used for the data transmission from a pre-configured pool of resources.

The reason to distinguish between state-3 OOC and state-4 OOC is mainly to avoid potentially strong interference between D2D transmissions from out-of-coverage devices and legacy E-UTRA transmissions. In general D2D-capable UEs will have preconfigured resource pool(s) for transmission of D2D SAs and data for use while out of coverage. If these out-of-coverage UEs transmit on these preconfigured resource pools near cell boundaries, then, interference between the D2D transmissions and in-coverage legacy transmissions could have a negative impact on communications within the cell. If D2D-enabled UEs within coverage forwarded the D2D resource pool configuration to those out-of-coverage devices near the cell boundary, then, the out-of-coverage UEs could restrict their transmissions to the resources specified by the eNode B and therefore minimize interference with legacy transmissions in coverage. Thus, RAN1 introduced a mechanism where in-coverage UEs are forwarding resource pool information and other D2D related configurations to those devices just outside the coverage area (state-3 UEs).

The Physical D2D synchronization channel (PD2DSCH) is used to carry this information about in-coverage D2D resource pools to the UEs in network proximity, so that resource pools within network proximity are aligned.

LCP Procedure for D2D, Sidelink Logical Channels

The LCP procedure for D2D will be different than the above-presented LCP procedure for "normal" LTE data. The following information is taken from TS 36.321, current version 12.5.0, subclause 5.14.1.3.1 describing LCP for ProSe; it is incorporated herewith in its entirety by reference.

The UE shall perform the following Logical Channel Prioritization procedure when a new transmission is performed:

The UE (e.g., MAC entity) shall allocate resources to the sidelink logical channels according to the following rules:

the UE should not segment an RLC SDU (or partially transmitted SDU) if the whole SDU (or partially transmitted SDU) fits into the remaining resources;

if the UE segments an RLC SDU from the sidelink logical channel, it shall maximize the size of the segment to fill the grant as much as possible;

the UE should maximize the transmission of data.

if the UE is given an sidelink grant size that is equal to or larger than 10 bytes while having data available for transmission, the UE shall not transmit only padding.

NOTE: The rules above imply that the order by which the sidelink logical channels are served is left for UE implementation.

Generally, for one PDU, MAC shall consider only logical channels with the same Source Layer-2ID—Destination Layer 2 ID pairs, i.e., for one PDU, the MAC entity in the UE shall consider only logical channels of the same ProSe destination group, which basically means that the UE selects a ProSe destination group during the LCP procedure. Furthermore, in Rel-12 during one SA/data period the D2D transmitting UE can only transmit data to one ProSe destination group.

All D2D (sidelink) logical channels, e.g., STCH, Sidelink Traffic CHannel, are allocated to the same logical channel group (LCG) with LCGID set to '11' (see subclause 5.14.1.4 "Buffer Status Reporting" of TS 36.321 version 12.5.0). In Rel-12 there is no prioritization mechanism for D2D (sidelink) logical channels/groups. Essentially, all sidelink logical channels have the same priority from UE point of view, i.e., the order by which the sidelink logical channels are served is left for UE implementation.

For illustration purposes only, the following exemplary scenario is considered where three ProSe logical channels, LCH #1, LCH #2, and LCH #3, are set up in the user equipment, and all three are associated with the same ProSe LCG (e.g., "11"). It is exemplarily assumed that LCH #1 and LCH #2 are assigned to ProSe destination group 1, and LCH #3 is assigned to ProSe destination group 2. This is depicted in FIG. 12.

Buffer Status Reporting for ProSe

Also the buffer status reporting is adapted to ProSe, and at present is defined in TS 36.321 in its version 12.5.0, subclause 5.14.1.4 "Buffer Status Reporting" incorporated herein by reference.

The (D2D) sidelink Buffer Status Reporting procedure is used to provide the serving eNB with information about the amount of sidelink data available for transmission in the sidelink buffers of the UE. RRC controls sidelink BSR reporting by configuring the two timers Periodic-ProseBSR-Timer and RetxProseBSR-Timer. Each sidelink logical channel (STCH) is allocated to an LCG with LCGID set to "11" and belongs to a ProSe Destination group.

A sidelink Buffer Status Report (BSR) shall be triggered if some particular events occurs, as specified in detail in TS 36.321, subclause 5.14.1.4.

Furthermore, TS 36.321 in its version 12.5.0, subclause 6.1.3.1a, incorporated herein by reference, defines the ProSe BSR MAC Control Elements and its corresponding content as follows. The ProSe Buffer Status Report (BSR) MAC control element consists of one group index field, one LCG ID field and one corresponding Buffer Size field per reported D2D destination group. More in detail, for each included ProSe destination group, the following fields are defined:

Group index: The group index field identifies the ProSe destination group. The length of this field is 4 bits. The value is set to the index of the destination identity reported in destinationInfoList;

LCG ID: The Logical Channel Group ID field identifies the group of logical channel(s) which buffer status is being reported. The length of the field is 2 bits and it is set to "11";

Buffer Size: The Buffer Size field identifies the total amount of data available across all logical channels of a ProSe Destination group after all MAC PDUs for the TTI have been built. The amount of data is indicated in number of bytes R: Reserved bit, set to "0."

FIG. 11 shows the ProSe BSR MAC control element for even N (number of ProSe destination groups), taken from TS 36.321 subclause 6.1.3.1a.

As has been explained above, the transmission scheme for device-to-device communication is quite different to the normal LTE scheme, including the use of ProSe destination groups to identify the possible content of the data. Some of currently-defined mechanisms are rather inefficient.

BRIEF SUMMARY

Non-limiting and exemplary embodiments provide improved methods for allocating radio resources for a transmitting user equipment to perform direct communication transmission over a direct sidelink connection to one or more receiving user equipments. The independent claims provide non-limiting and exemplary embodiments. Advantageous embodiments are subject to the dependent claims.

According to several aspects, performing direct communication transmissions by a transmitting user equipment is improved (not only for but) particularly for scenarios in which data is available for transmission in the transmitting user equipment destined to more than one sidelink destination group.

According to a first aspect, a new concept of sidelink grant processes is introduced so as to allow a user equipment to handle several sidelink grants at basically the same time; in other words, to enable the user equipment to transmit several direct communication transmissions at basically the same time (e.g., within the same transmission control period). Correspondingly, each direct communication transmission could be configured to transmit data for the same or different sidelink destination groups.

In the prior art a sidelink grant is overwritten by a subsequently-received sidelink grant. On the other hand, by having a plurality of sidelink grant processes available in the UE according to this first aspect, it is possible to assign different sidelink grants to different sidelink grant processes; i.e., a sidelink grant can still be overwritten (if a new sidelink grant for the same sidelink grant process is received) but the UE can have several valid sidelink grants at the same time (no overwriting needs to take place). A corresponding ID for each of the sidelink grant processes shall allow unambiguous association of a sidelink grant to one of the processes. Furthermore, one sidelink grant process shall be associated only with one (valid) sidelink grant; when acquiring a further sidelink grant associated with the same sidelink grant process, the previous sidelink grant shall be overwritten, as already mentioned.

Correspondingly, for each of the sidelink grant processes and their respective associated sidelink grants, the UE would allocate radio resources according to the respective sidelink grant to transmit a direct communication transmission comprising the transmission of sidelink control information and data destined to one sidelink destination group.

Then, in case data for various sidelink destination groups is available for transmission in the user equipment, the user equipment may decide to use each of the available sidelink grants for transmitting data for a different sidelink destination group. Consequently, the transmitting user equipment performs one direct communication transmission per sidelink grant process at basically the same time (i.e., within the same transmission control period), where each of the direct communication transmissions could include data destined to a different sidelink destination group. In one implementation of the first aspect, the radio resources for the multiple direct communication transmissions performed within the same transmission control period shall not overlap in the time domain; time division is used for direct communication transmissions.

Starvation of one sidelink destination group can be avoided according to the first aspect. Furthermore, from the perspective of the receiving user equipment, there is no change of the transmission scheme since the transmitting user equipment transmits data of only one sidelink destination group per direct communication transmission (i.e., per sidelink grant process). Correspondingly, the sidelink control information can stay the same. In one implementation of the first aspect, determining the sidelink destination group(s) of which data should be transmitted can be performed by the transmitting user equipment either using a common logical channel prioritization procedure so as to determine the sidelink destination group(s) for all of the acquired sidelink grants, or the transmitting user equipment uses a separate logical channel prioritization procedure for each sidelink grant.

The principles of the first aspect are applicable to both resource allocation methods, i.e., where the transmitting user equipment requests and then receives a corresponding sidelink grant from a radio base station and where the transmitting user equipment autonomously selects a sidelink grant from suitable transmission radio resource pool(s). For the case where the radio base station transmits a scheduling message with the sidelink grant to the transmitting user equipment, the sidelink scheduling message (apart from comprising, e.g., information on the content of the scheduling control information to be transmitted by the transmitting user equipment and information on the radio resources to be used for transmitting the scheduling control information and data) may also identify the sidelink grant process to which the sidelink grant is to be associated. On that basis, the transmitting user equipment can then associate the received sidelink grant to the intended sidelink grant process.

According to a second aspect, the direct communication transmission is improved by basically allowing a scheduling assignment (sidelink control information) transmitted by a transmitting user equipment to identify multiple sidelink destination groups. Correspondingly, it is assumed that data destined to a plurality of sidelink destination groups is available for transmission in the transmitting user equipment, and further that the transmitting user equipment has a sidelink grant available for performing a direct communication transmission. The transmitting user equipment determines at least two sidelink destination groups among the plurality the data of which shall be carried in the direct communication transmission. The sidelink control information relating to the direct communication transmission shall identify the determined at least two sidelink destination groups and the radio resources allocated to transmit the sidelink control information and the corresponding data destined to the determined at least two sidelink destination groups. Correspondingly, the transmitting user equipment performs a direct communication transmission which may carry data for multiple sidelink destination groups.

According to an implementation of the second aspect, the sidelink control information message comprises one ID per sidelink destination group.

According to an alternative implementation of the second aspect, the sidelink control information message comprises one sidelink ID, which is associated with multiple sidelink destination groups. For this alternative implementation, a mapping function is to be introduced so as to establish an association between different sidelink IDs and corresponding sidelink destination groups, and corresponding information on this association needs to be provided to both transmitting and receiving user equipments. Then, the transmitting user equipment, after determining the sidelink destination groups the data of which is to be carried by the direct communication transmission, shall determine a corresponding sidelink ID based on this association such that the sidelink ID is associated with the determined sidelink destination groups. The sidelink ID can then be included in the corresponding sidelink control information, instead of the various IDs of the sidelink destination groups. At the receiving side, the receiving UE can then determine the sidelink destination groups to which the sidelink ID refers, also based on this information on the associations.

The principles of the second aspect are applicable to both resource allocation methods, i.e., where the transmitting user equipment requests and then receives a corresponding sidelink grant from a radio base station and where the transmitting user equipment autonomously selects a sidelink grant from suitable transmission radio resource pool(s).

Correspondingly, in one general first aspect, the techniques disclosed here feature a method for allocating radio resources for a transmitting user equipment to perform direct communication transmissions over a direct sidelink connection to one or more receiving user equipments in a communication system. At least two sidelink grant processes are provided in the transmitting user equipment for the transmitting user equipment to be able to handle at least two sidelink grants within the same transmission control period. Each one of the at least two sidelink grant processes is associated with an identification and can be associated with one sidelink grant. At least two sidelink grants are acquired, each of which is associated by the transmitting user equipment with one of the at least two sidelink grant processes. Furthermore, for each of the at least two sidelink grants, radio resources are allocated by the transmitting user equipment according to the respective sidelink grant to perform a direct communication transmission of sidelink control information and of data over the direct sidelink connection. Thus, the transmitting user equipment performs a direct communication transmission per sidelink grant process with correspondingly-associated sidelink grant within the same transmission control period.

Correspondingly, in one general first aspect, the techniques disclosed here feature another method for allocating radio resources for a transmitting user equipment to perform direct communication transmissions over a direct sidelink connection to one or more receiving user equipments in a communication system. Data destined to a plurality of sidelink destination groups is available for transmission in the transmitting user equipment. A sidelink grant is available to the transmitting user equipment to be used for a direct communication transmission. The transmitting user equipment determines at least two sidelink destination groups from the plurality of sidelink destination groups as destinations of a direct communication transmission. The transmitting UE allocates radio resources according to the available sidelink grant to be used for the direct communication transmission. The transmitting UE generates a sidelink control information message identifying the determined at least two sidelink destination groups and the allocated radio resources. The transmitting UE performs a direct communication transmission of the generated sidelink control information message and of data destined to the determined at least two sidelink destination groups over the direct sidelink connection.

Correspondingly, in one general first aspect, the techniques disclosed here feature a user equipment for performing direct communication transmissions over a direct sidelink connection to one or more receiving user equipments in a communication system. At least two sidelink grant processes are provided in the transmitting user equipment for the transmitting user equipment to be able to handle at least two sidelink grants within the same transmission control period. Each one of the at least two sidelink grant processes is associated with an identification and can be associated with one sidelink grant. A processor of the transmitting user equipment acquires at least two sidelink grants and to associate each of the acquired at least two sidelink grants with one of the at least two sidelink grant processes. For each of the at least two sidelink grants, the processor allocates radio resources according to the respective sidelink grant to perform a direct communication transmission of sidelink control information and of data over the direct sidelink connection. Thus, the transmitting user equipment performs a direct communication transmission per sidelink grant process with correspondingly-associated sidelink grant within the same transmission control period.

Correspondingly, in one general first aspect, the techniques disclosed here feature another user equipment for performing direct communication transmissions over a direct sidelink connection to one or more receiving user equipments in a communication system. The transmitting user equipment comprises a buffer storing data available for transmission and destined to a plurality of sidelink destination groups. A sidelink grant is available to the transmitting user equipment to be used for a direct communication transmission. A processor of the transmitting user equipment determines at least two sidelink destination groups from the plurality of sidelink destination groups as destinations of a direct communication transmission. The processor allocates radio resources according to the available sidelink grant to be used for the direct communication transmission. The processor generates a sidelink control information message identifying the determined at least two sidelink destination groups and the allocated radio resources. The processor and a transmitter of the transmitting UE performs a direct communication transmission of the generated sidelink control information message and of data destined to the determined at least two sidelink destination groups over the direct sidelink connection.

Correspondingly, in one general first aspect, the techniques disclosed here feature a radio base station for allocating radio resources to a transmitting user equipment for the transmitting user equipment to perform direct communication transmissions over a direct sidelink connection to one or more receiving user equipments in a communication system. At least two sidelink grant processes are provided in the transmitting user equipment for the transmitting user equipment to be able to handle at least two sidelink grants within the same transmission control period. Each one of the at least two sidelink grant processes is associated with an identification and can be associated with one sidelink grant. A processor of the radio base station generates a sidelink grant and associates the generated sidelink grant with one of the at least two sidelink grant processes. The processor generates a sidelink scheduling message including an identification of the one sidelink grant process associated to the sidelink grant. A transmitter of the radio base station transmits the generated sidelink scheduling message to the transmitting user equipment.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

FIG. 6 illustrates the transmission of the Scheduling Assignment and the D2D data for two UEs, FIG. 7 illustrates the D2D communication timing for the UE-autonomous scheduling Mode 2.

DETAILED DESCRIPTION

Figure 1:
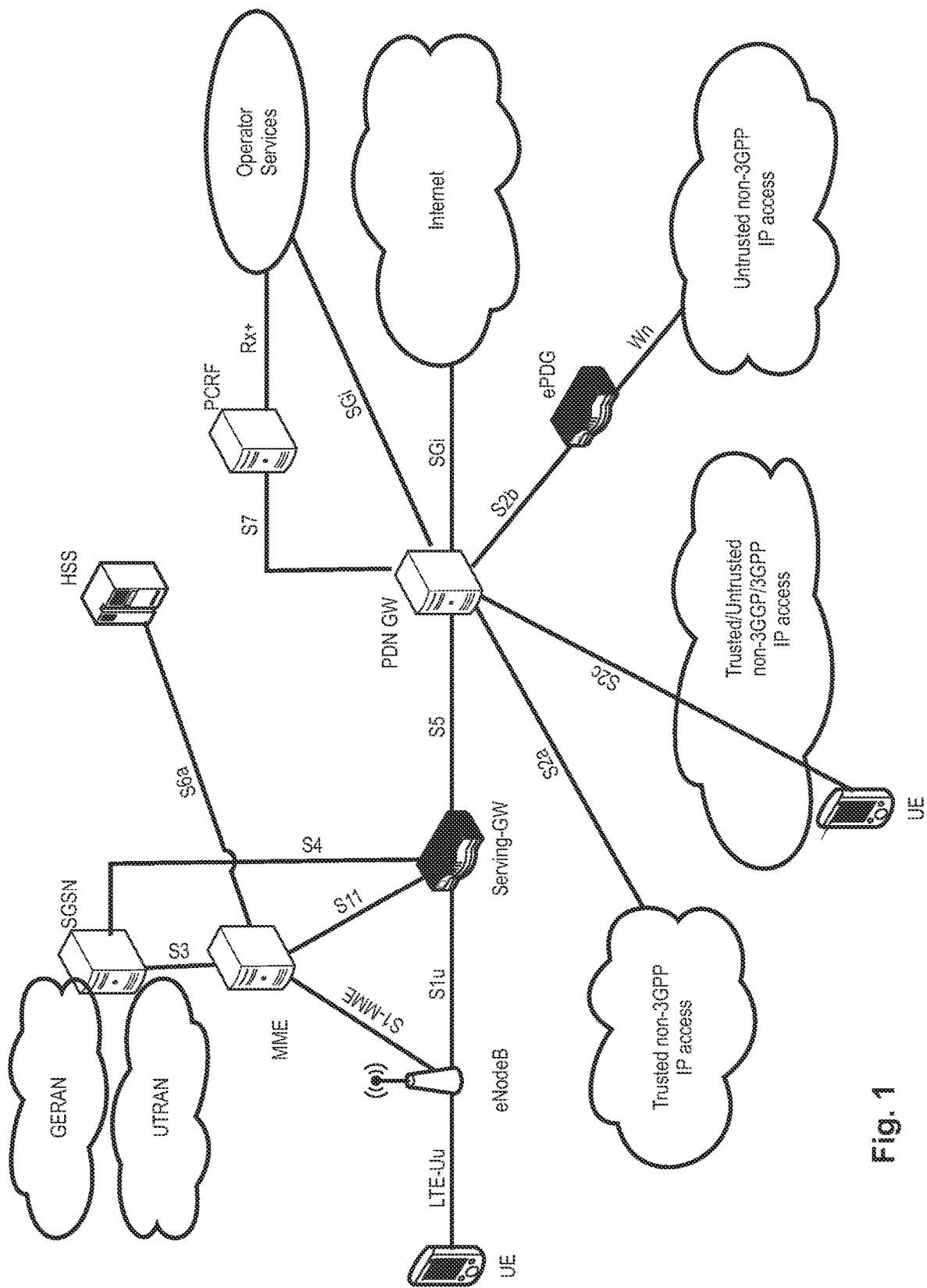
FIG. 1 shows an exemplary architecture of a 3GPP LTE system.
Figure 2:
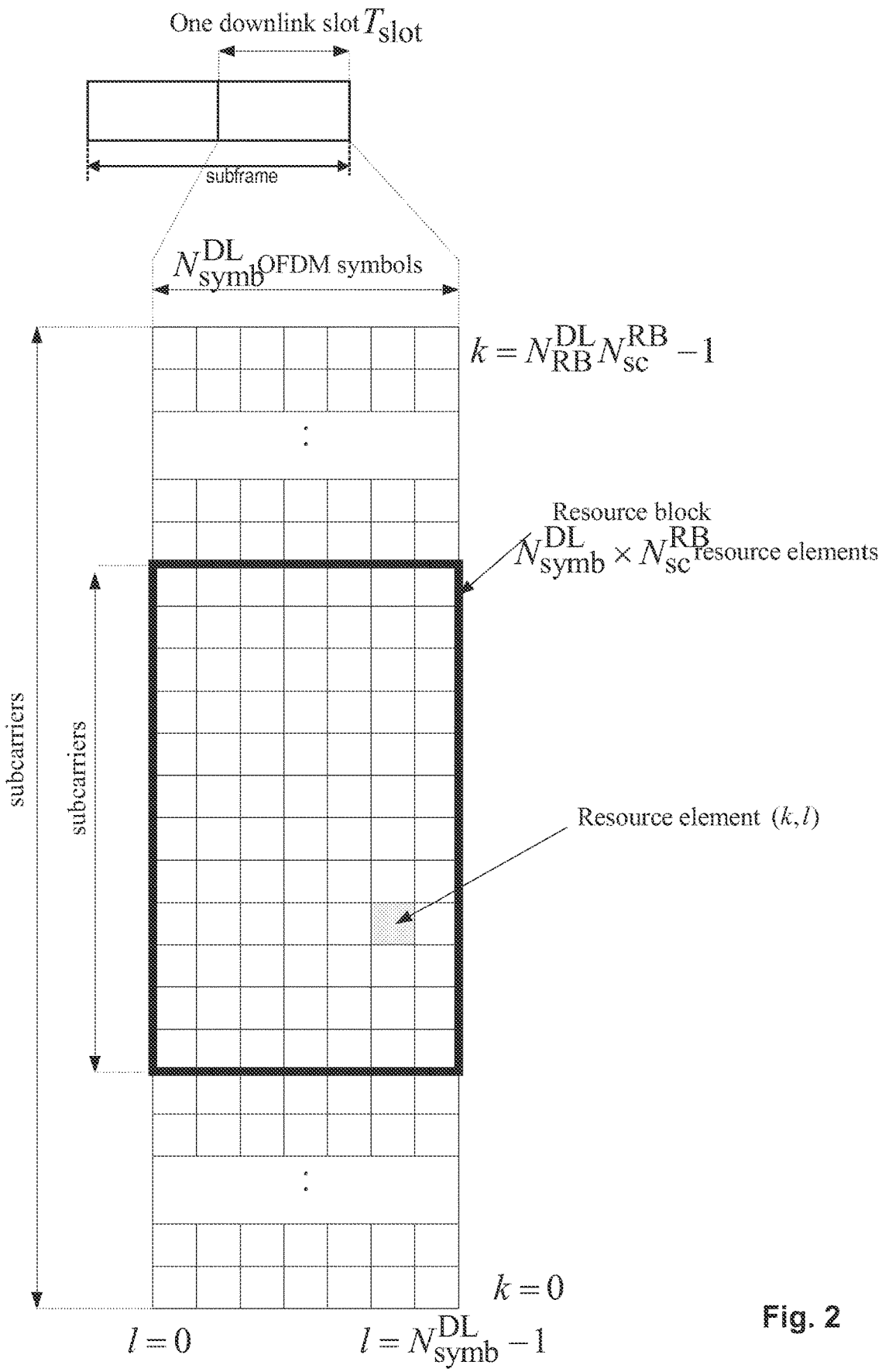
FIG. 2 shows an exemplary downlink resource grid of a downlink slot of a subframe as defined for 3GPP LTE (Release 8/9), FIG. 3 schematically illustrates a PC 5 interface for device-to-device direct discovery, FIG. 4 schematically illustrates a radio protocol stack for ProSe direct discovery.
Figure 3:
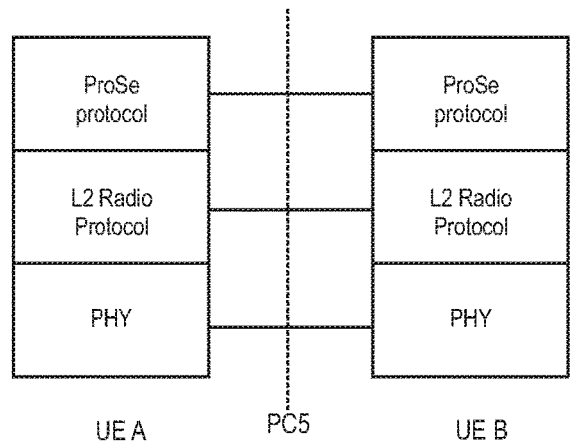
Figure 4:
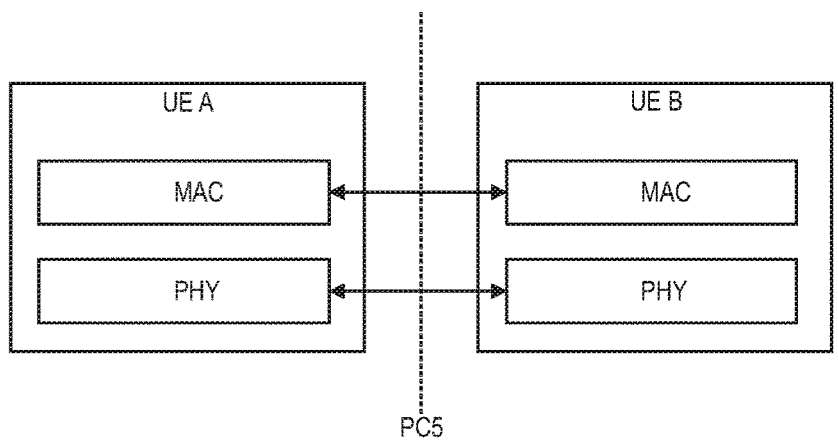
Figure 5:
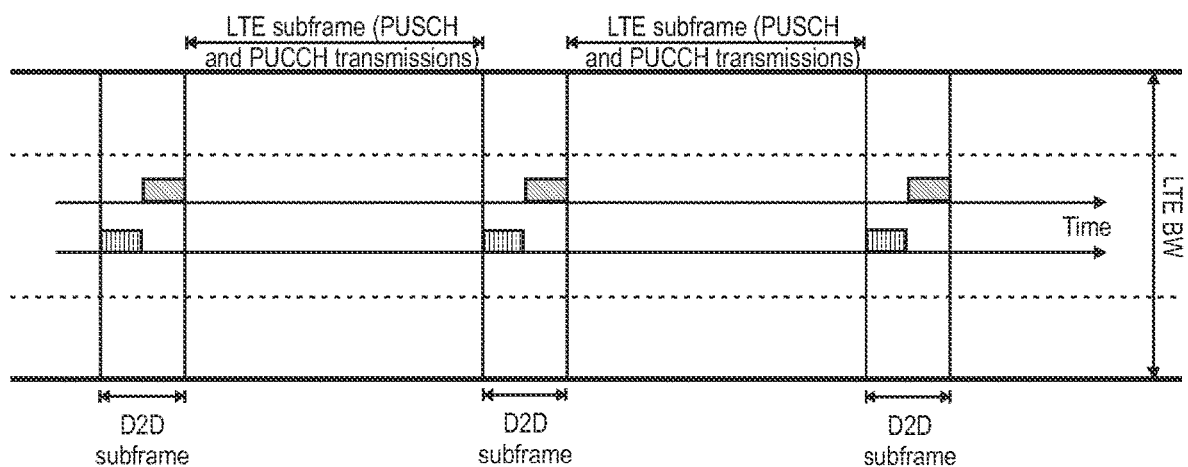
FIG. 5 illustrates the use of transmission/reception resources for overlay (LTE) and underlay (D2D) systems.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "direct communication transmission" as used in the set of claims and in the application is to be broadly understood as a transmission directly between two user equipments, i.e., not via the radio base station (e.g., eNB). Correspondingly, the direct communication transmission is performed over a "direct sidelink connection," which is the term used for a connection established directly between two user equipments. For example, in 3GPP the terminology of D2D (Device-to-Device) communication is used or ProSe communication, or a sidelink communication. The term "direct sidelink connection" as used in the set of claims and in the application is to be broadly understood and can be understood in the 3GPP context as the PC5 interface described in the background section.

The term "sidelink grant process" as used in the set of claims and in the application is to be broadly understood as a process available in a user equipment to which a sidelink grant can be associated. Exemplarily, a sidelink grant process can be also broadly understood as a memory region in a user equipment where a sidelink grant or sidelink grant information is stored and maintained. Each memory region is managed by the user equipment, e.g., storing, erasing sidelink grant information or overriding stored sidelink grant information with newly received sidelink grant information.

The term "transmission control period" as used in the set of claims and in the application is to be broadly understood as the period of time where a user equipment performs the transmission of a scheduling assignment (sidelink control information) and corresponding data. Put differently, a "transmission control period" can also be seen as that period of time for which a sidelink grant is valid. As currently standardized in the 3GPP environment, the "transmission control period" can be understood as the SA/data period, or the SC (sidelink control) period.

The term "ProSe destination group" or "sidelink destination group" used in the set of claims and in the remaining application can be understood as, e.g., one Source Layer-2 ID—Destination Layer 2 ID pair defined in 3GPP LTE.

The expressions "acquiring a (sidelink) grant," "having a (sidelink) grant available," "receiving a (sidelink) grant," and similar expressions, shall be understood broadly as meaning that the (sidelink) grant is either acquired/received from the responsible radio base station (i.e., Mode1), or that the UE acquires the (sidelink) grant itself by autonomously selecting resources for a grant from suitable transmission resource pool(s) (i.e., Mode2) (i.e., the UE internally receives the grant).

The currently-standardized transmission scheme to be used for D2D communication, both relating to Mode1 (i.e., eNB-scheduled) and Mode2 (autonomous-scheduling), has been explained in the background section. In particular, at the moment a UE can have only one (valid) sidelink grant (SL grant) per sidelink control period (SC period). Even if the eNB issues several grants to the UE in Mode1, the UE only considers the last received one as the valid one and overwrites the previously-received SL grant(s). Correspondingly, since there is only one SL grant available per SC period, the UE can only transmit one scheduling assignment per SC period. In turn, at the moment the UE can transmit data only for one ProSe destination group per scheduling assignment respectively scheduling control information (SCI). More in particular for PDU(s) associated with one SCI, UE shall consider only logical channels with same Source Layer-2 ID-Destination Layer-2 ID pairs. This currently-standardized D2D transmission scheme causes several disadvantages.

In case the UE has data for more than one ProSe destination group in its buffer, the UE can transmit data of only one ProSe destination group in one SC period, such that the data of the remaining ProSe destination group(s) is basically delayed by at least one further SC period. Depending on the configured SC periodicity and the number of SC periods required to transmit the complete data of one ProSe destination group, the delay could become quite significant. This is even the case, where the resources available for transmission would be enough to transmit data of more than the first-served ProSe destination group. In more detail, the eNB might assign more D2D transmission resources (by means of the SL-grant) than the UE needs, i.e., the UE has not enough data in its buffer for one ProSe destination group to utilize all of the assigned radio resources. For instance, this could happen when the buffer status information received at the eNB side is not accurate, or outdated. In said case, part of the allocated resources remain unused since they cannot be used for transmission of data of another ProSe destination group.

The following exemplary embodiments are conceived by the inventors to mitigate the problems explained above.

Some of these are to be implemented in the wide specification as given by the 3GPP standards and explained partly in the background section, with the particular key features being added as explained in the following pertaining to the various embodiments. It should be noted that the embodiments may be advantageously used for example in a mobile communication system, such as 3GPP LTE-A (Release 10/11/12/13) communication systems as described in the Technical Background section above, but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the invention and its embodiments as such.

First Embodiment

In the following a first embodiment for solving the above problem will be described in detail. Implementations of the first embodiment will be explained in connection with FIGS. 13 to 15.

For illustration purposes, several assumptions are made which however shall not restrict the scope of the embodiment. For one thing, user equipments are assumed which are enabled to perform ProSe communication (ProSe-enabled UEs), i.e., D2D transmissions directly between UEs without the detour via the eNodeB. Furthermore, the UEs shall have data destined to a plurality of sidelink destination groups (i.e., ProSe destination groups) available for transmission, although the improved direct communication transmission according to the first embodiment is also applicable where only data for a single sidelink destination group is available for transmission in the UE.

The first embodiment improves direct communication transmissions by introducing the concept of (a plurality of) sidelink grant processes in a UE to which sidelink grant(s) can be assigned in a one-to-one manner. Put differently, a UE can handle a plurality of sidelink grants by operating a corresponding sidelink grant process for each sidelink grant. The sidelink grant process can be addressed by use of a corresponding identification, exemplarily termed in the following sidelink grant process ID, which allows sidelink grants to be unambiguously assigned to a particular sidelink grant process.

Whereas the currently-standardized system only allows for a single sidelink grant to be handled by a UE at the same time (any further received sidelink grant(s) overwrites the previous one, such that there is only one valid sidelink grant in one SC period), the first embodiment shall improve D2D communication by allowing a UE to have more than one valid sidelink grant at a particular point in time (e.g., within one SC period). Put differently, a UE operating according to the first embodiment is allowed to have one valid sidelink grant per sidelink grant process such that the number of possible valid sidelink grants for an SC period for a UE is limited by the number of sidelink grant processes that a UE can operate at most. Correspondingly, a UE, which acquires a sidelink grant addressed to a sidelink grant process which already has a sidelink grant, overwrites the old sidelink grant with the newly-acquired sidelink grant (similar as in the presently standardized systems).

According to an implementation of the first embodiment, the UE for instance may be allowed to have two sidelink grant processes at most such that the UE would be able to handle two different sidelink grants at the same time (a UE thus has two valid sidelink grants within an SC period). Correspondingly, the sidelink grant process ID could have a size of one bit so as to be able to distinguish between the two sidelink grant processes. Other implementations of the first embodiment allow for a larger number of sidelink grant processes to be started in a UE, for instance 4, or 8 etc., which allows a UE to handle even more sidelink grants simultaneously. The corresponding sidelink grant process ID however would then have a size of more bits so as to be able to distinguish between the various sidelink grant processes; e.g., 2 bits for 4 total sidelink grant processes; 3 bits for 8 total sidelink grant processes; etc.

The number of sidelink grant processes which a UE shall handle at maximum can be configured, e.g., by RRC, or may be predetermined (e.g., fixed in a corresponding 3GPP standard).

Overall, the UE will perform a D2D transmission for each sidelink grant process with a corresponding sidelink grant within the same SC period, e.g., respectively according to already-standardized concepts for performing D2D transmissions as explained in the background section. In particular, for each sidelink grant available to the UE (i.e., for each sidelink grant process), the UE determines one sidelink destination group and generates the corresponding transport blocks containing the data destined to the determined sidelink destination group. Radio resources are allocated for the D2D transmissions according to the respective sidelink grant. For each sidelink grant available to the UE (i.e., for each sidelink grant process), the UE generates corresponding sidelink control information identifying the sidelink destination group and also the allocated radio resources for the corresponding D2D transmission, and performs the D2D transmission of the sidelink control information and the corresponding data for each sidelink grant (process) using the allocated radio resources of the respective sidelink grant.

Details on these steps for performing a D2D transmission are omitted here, and instead reference is made to the corresponding passages in the background section of this application.

The above described principles underlying the first embodiment entail various advantages. Already established procedures can be reused in said respect without modification. For instance, the same SCI format 0 can be used to transmit the sidelink control information since no additional information needs to be carried. Furthermore, since the D2D transmission for each sidelink grant process remains unchanged when compared to the currently standardized D2D transmissions, a receiving UE does not (and actually does not need to) distinguish between a D2D transmission performed according to the first embodiment for one sidelink grant process and a D2D transmission performed according to the current standard. Consequently, the UE behavior on the receiving side does not need to be adapted.

Furthermore, the first embodiment allows transmitting more data within an SC period, thus increasing the data rate for D2D transmissions.

In addition, the first embodiment allows transmitting data destined to several sidelink destination groups within the same SC period by, e.g., selecting a different sidelink destination group for each of the various sidelink grant processes. Therefore, starvation of particular sidelink destination groups can be avoided.

So far it was generally assumed that the UE had several sidelink grants available, without paying attention on how the UE had acquired them in the first place. Actually, for the operation of the UE according to the principles of the first embodiment, it is not important whether the UE acquired the sidelink grants according to Mode 1 (eNB—scheduled) or Mode 2 (autonomous selection by UE); put differently, the first embodiment is applicable to cases where each of the sidelink grants is acquired according to Mode 1 or acquired according to Mode 2; also, one sidelink grant could be scheduled by Mode 1 and another by Mode 2.

In case of Mode 1, one or more sidelink grants are received from the eNB, based on corresponding request(s) from the UE, e.g., a scheduling request or RACH procedure with corresponding buffer status information as explained in the background section. In Mode 1, each sidelink grant is received in a corresponding sidelink scheduling message transmitted by the eNB to the UE, which additionally may identify the sidelink grant process to which the sidelink grant shall be assigned by the UE. For example a corresponding sidelink grant process ID as mentioned above can be included by the eNB in a corresponding field of the sidelink scheduling message, which can then be used by the UE to identify the respective sidelink grant process to which the received sidelink grant is to be assigned.

According to one implementation of the first embodiment, a new DCI format (exemplarily termed DCI format 5a) can be introduced in said respect, which at least contains the sidelink grant process ID in a corresponding field. The amount of bits of such a new field, containing the sidelink grant process ID, depends on the overall maximum number of sidelink grant processes that shall be available to the UE. For example the new sidelink grant process ID field can have 2 bits, thereby allowing distinguishing between 4 total sidelink grant processes.

At least one or all of the further possible fields can also be foreseen for the new DCI format 5a:
Resource for PSCCH
TPC command for PSCCH and PSSCH
SCI format 0 fields:
  Frequency hopping flag
  Resource block assignment and hopping resource allocation
  Time resource pattern These other possible fields for the new DCI format 5a are corresponding to the same fields already standardized for DCI format 5 (referred to 3GPP technical standard 36.212, current version 12.4.0, subclause 5.3.3.1.9).

As mentioned before, in the prior art the sidelink scheduling message used for transmitting the sidelink grant is of the DCI format 5 (see background section). The 3GPP technical standard 36.212, current version 12.4.0, subclause 5.3.3.1.9 currently defines with respect to DCI format 5:

If the number of information bits in format 5 mapped onto a given search space is less than the payload size of format 0 for scheduling the same serving cell, zeros shall be appended to format 5 until the payload size equals that of format 0 including any padding bits appended to format 0.

As apparent therefrom, "zeros" are appended to DCI format 5 so as to equal its payload size to that of DCI format 0 so as to facilitate blind decoding. According to a further implementation of the first embodiment, and instead of introducing a new DCI these padding bits (i.e., "zeros") can be reused to indicate the sidelink grant process ID.

Alternatively there are other ways to convey the new sidelink grant process ID field within a sidelink grant. In particular, some bits of any of the existing DCI (e.g., DCI format 5) may be redefined for said purpose. In this case there needs to be some predefined codepoint(s) of at least one of the field conveyed within this DCI or a combination of predefined codepoints of several fields which indicates that remaining bits within the DCI are interpreted differently, i.e., indicating the sidelink grant process ID.

As has been explained before, the UE may perform several D2D transmissions within the same sidelink control period (e.g., one per sidelink grant process). In general, the various D2D transmissions performed by the UE within the same sidelink control period shall not overlap in the time domain, i.e., the UE performs the D2D transmissions at different subframes. In particular, the radio resources used for transmitting the sidelink control information messages, taken from the corresponding transmission pools, shall not overlap in time. Similarly, the T-RPT patterns defining the timing of the MAC PDU's first transmission and its retransmissions shall be selected accordingly so as to avoid that the data transmissions of the two D2D transmissions overlap in time. The same applies to the transmission resources for the Scheduling control info (SCI), i.e., SCI transmission of the different sidelink grant processes shall not overlap in time.

In case of a Mode 1-scheduled D2D transmission, the eNodeB determines non-overlapping T-RPT patterns and transmission resources for SCI and informs same to the UE in the respective sidelink scheduling messages. On the other hand, in case of a Mode 2-scheduled D2D transmission, the UE itself, when selecting the resources from the corresponding pools, shall take care that non-overlapping radio resources are selected for the various D2D transmissions, respectively the SCI and the data.

Figure 8:
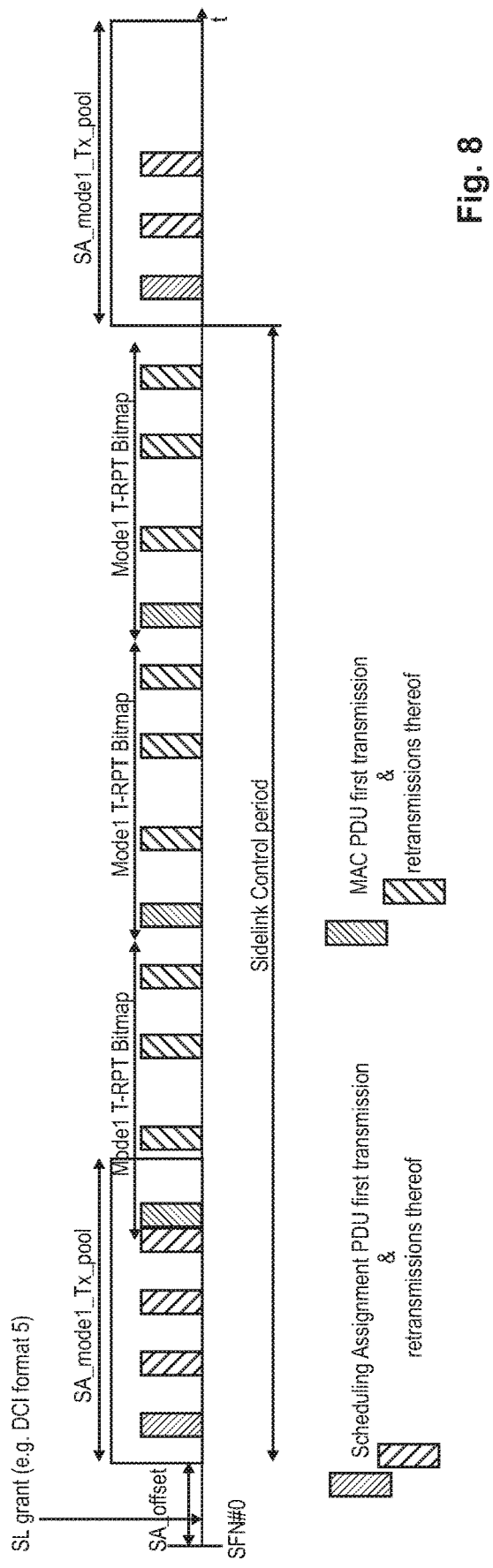
FIG. 8 illustrates the D2D communication timing for the eNB-scheduled scheduling Mode 1.
Figure 9:
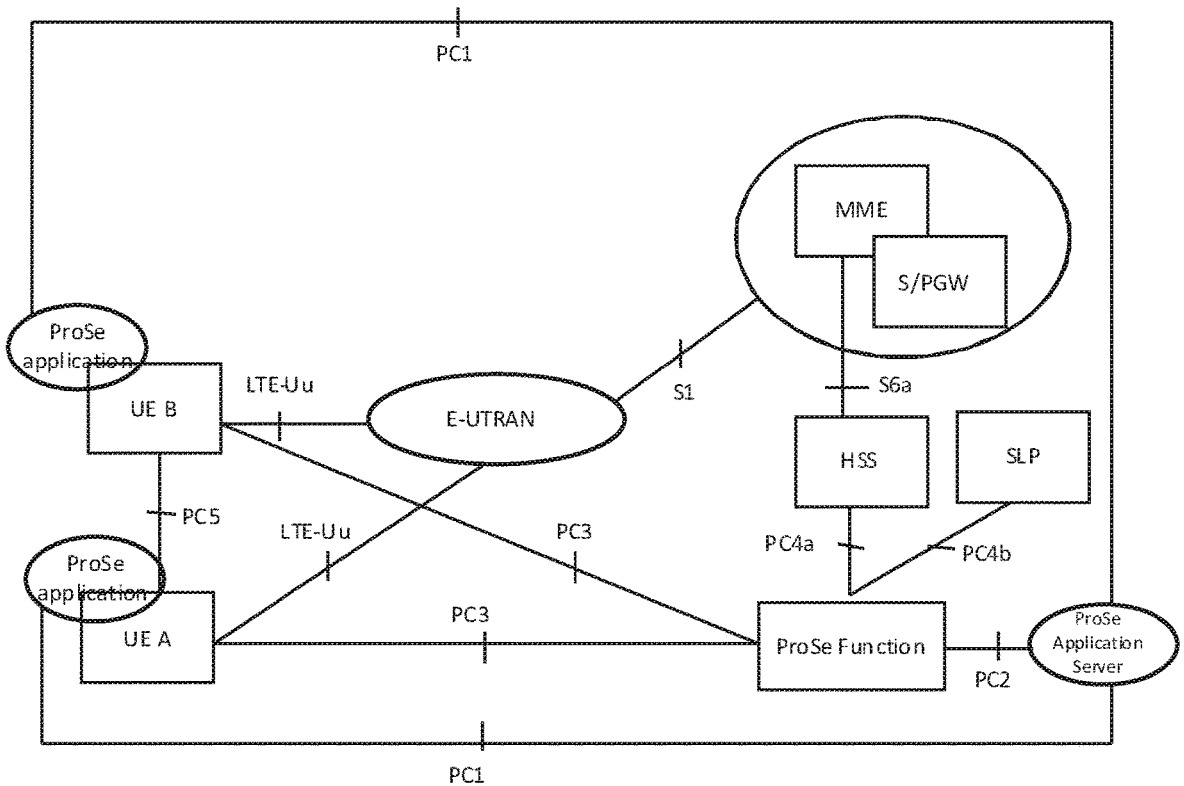
FIG. 9 illustrates an exemplary architecture model for ProSe for a non-roaming scenario.
Figure 10:
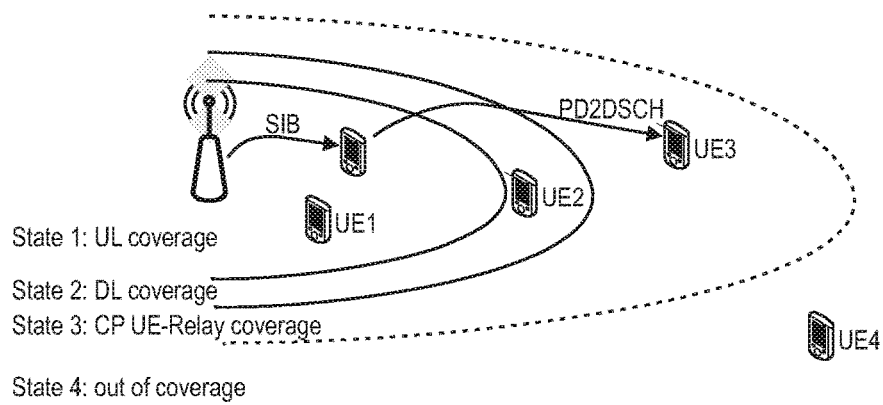
FIG. 10 illustrates cell coverage regarding four different states the D2D UE can be associated to, FIG. 11 illustrates the ProSe Buffer Status Reporting MAC Control Element defined in the standard.
Figures 11, 12:
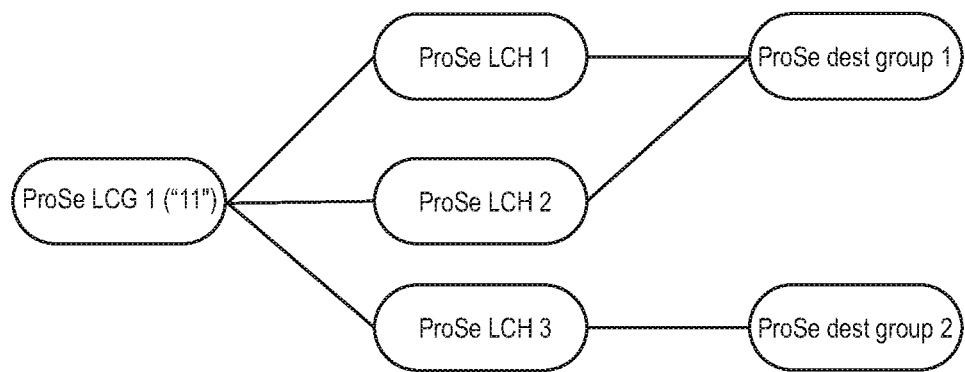
FIG. 12 illustrates an association between ProSe logical channels, ProSe LCGs, and ProSe destination groups for an exemplary scenario.

Alternatively, in order to ensure that the radio resources used for transmitting the SCI and corresponding data of each of the D2D transmissions do not overlap in time, e.g., different SA_offsets can be defined for each sidelink grant process. The SA_offset is a parameter defining the start of the D2D transmission (see FIGS. 7 and 8) thus influencing the start of the SCI transmission and in turn the data transmission. In addition, for Mode-2-scheduled data transmission a different Mode2data_offset value can be used for the different sidelink grant processes, which would allow that the data transmission would not overlap in time, even when using the same T-RPT bitmaps for the data transmission of the various D2D transmissions.

Figure 13:
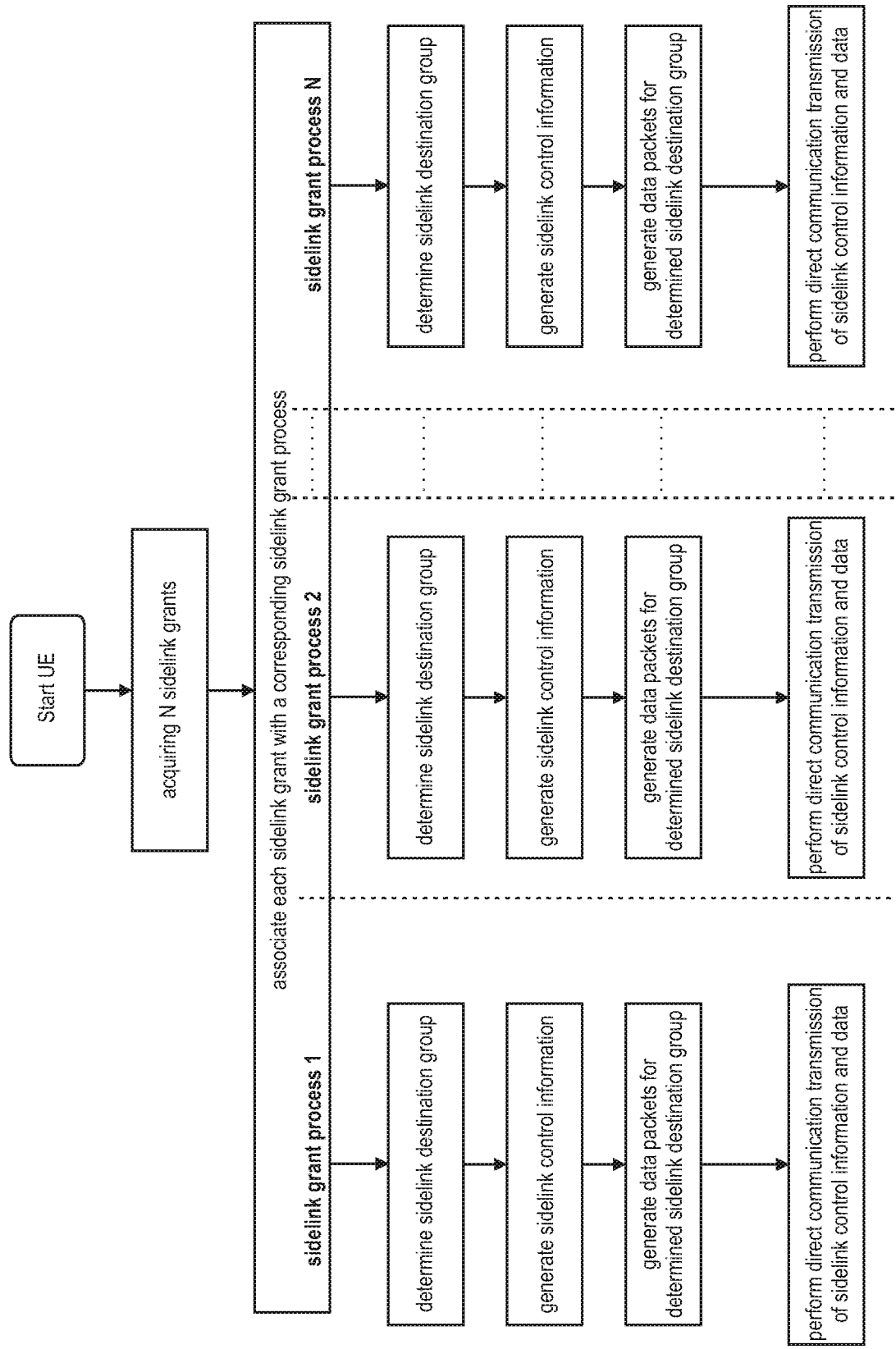
FIG. 13 illustrates a sequence diagram for the UE behavior on the transmitting side according to an implementation of the first embodiment.

FIG. 13 is a sequence diagram for a UE operation to perform D2D transmissions according to the first embodiment. Although the concept as shown in FIG. 13 is basically equally applicable for Mode 1- and Mode-2-scheduled D2D transmission, the specifically-depicted order of steps is rather applicable to Mode 1 (eNB-scheduled scenarios) where a UE receives a sidelink grant from the eNB. Furthermore, for a Mode2-scheduled D2D transmission, the UE may first select the sidelink destination group(s) for which data is to be transmitted, after which the UE then acquires the corresponding (various) sidelink grants by autonomously selecting from appropriate transmission radio resource pool(s). Based on the thus acquired sidelink grant, the sidelink control information and the corresponding sidelink data is generated for performing the D2D transmission.

As apparent from FIG. 13, N sidelink grant processes are assumed in this exemplary scenario which are available in the UE so as to handle corresponding sidelink grants; N is ≥1 but ≤max. no of sidelink grant processes. In FIG. 13, N shall not be the maximum number of sidelink grant processes that can be configured for a UE, but rather the number of sidelink grant processes which are currently "active" for respectively handling a previously acquired sidelink grant; i.e., the UE acquired and sidelink grants, one for each of the N sidelink grant processes.

FIG. 13 illustrates that the D2D transmission for each sidelink grant process are independent from one another, although they take place at basically the same time such that the D2D transmissions are performed within the same SC period.

Figure 14:
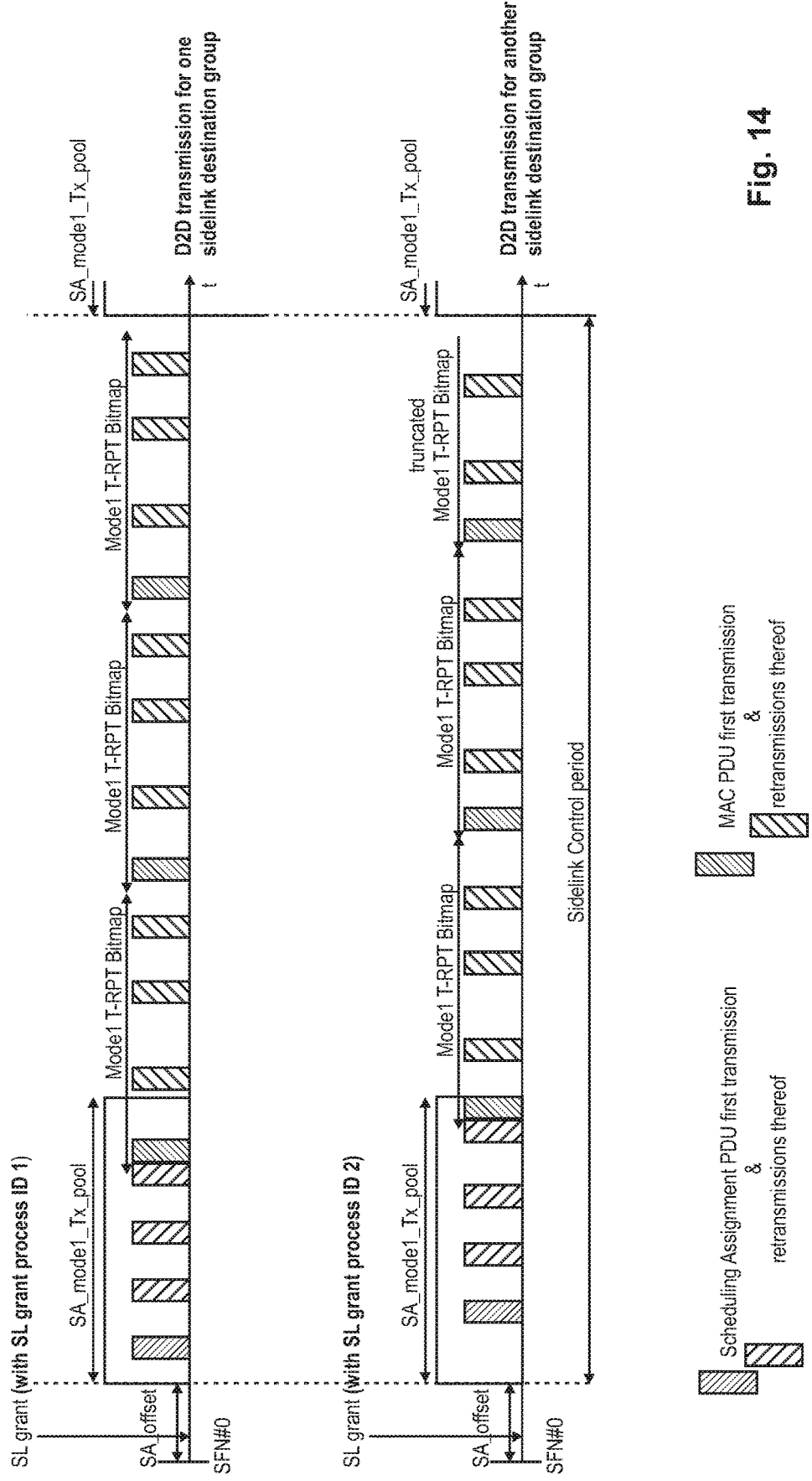
FIG. 14 illustrates the D2D communication timing for two eNB-scheduled D2D transmissions according to an implementation of the first embodiment.

FIG. 14 in turn illustrates the D2D communication timing for a Mode 1-scheduled scenario during one SC period according to the first embodiment. FIG. 14 is based on the illustration used already in FIG. 8, similarly indicating an SA-offset time, after which the SC period begins with transmission of a scheduling assignment (sidelink control information) using corresponding transmission pool resources, as indicated in the sidelink grant received from the eNodeB. In this exemplary scenario it is again exemplarily assumed that the first transmission of the SCI is followed by three retransmissions of the same SCI message. Then, after transmission of the scheduling assignment, the UE begins the D2D data transmission in the next uplink subframe. A MAC PDU is transmitted in its first transmission and retransmission(s) as configured by the T-RPT (time resource pattern of transmission).

As apparent from FIG. 14, it is assumed that the UE receives two sidelink grants from the eNodeB, respectively being addressed to different sidelink grant processes, in this exemplary case to sidelink grant processes with ID 1 and ID 2. As explained in connection with FIG. 13, a UE performs a D2D transmission for each sidelink grant process (i.e., in this case for each of the two sidelink grants) within basically the same sidelink control period (e.g., starting at the same time after the SA_offset and lasting for the length of the sidelink control period). This is accordingly depicted in FIG. 14 showing two D2D transmissions of a scheduling assignment and the corresponding data performed by a transmitting user equipment. In the exemplary scenario assumed for FIG. 14, the upper D2D transmission is assumed to be destined to a different sidelink destination group than the lower one (however, the two D2D transmissions could carry data for the same sidelink destination group).

As mentioned before, the radio resources used for transmitting the several D2D transmissions shall not overlap in time. As apparent from FIG. 14, the eNodeB selected, and correspondingly indicated in the sidelink grants, non-overlapping radio resources in the time domain for the transmission of the two scheduling assignments. Furthermore, the eNodeB selected, and correspondingly indicated in the sidelink grants, non-overlapping radio resources in the time domain for the transmission of the respective data and the corresponding control information (SCI) of the two D2D transmissions. As can be seen from FIG. 14, the respective T-RPT bitmaps are different between the two D2D transmissions.

Figure 15:
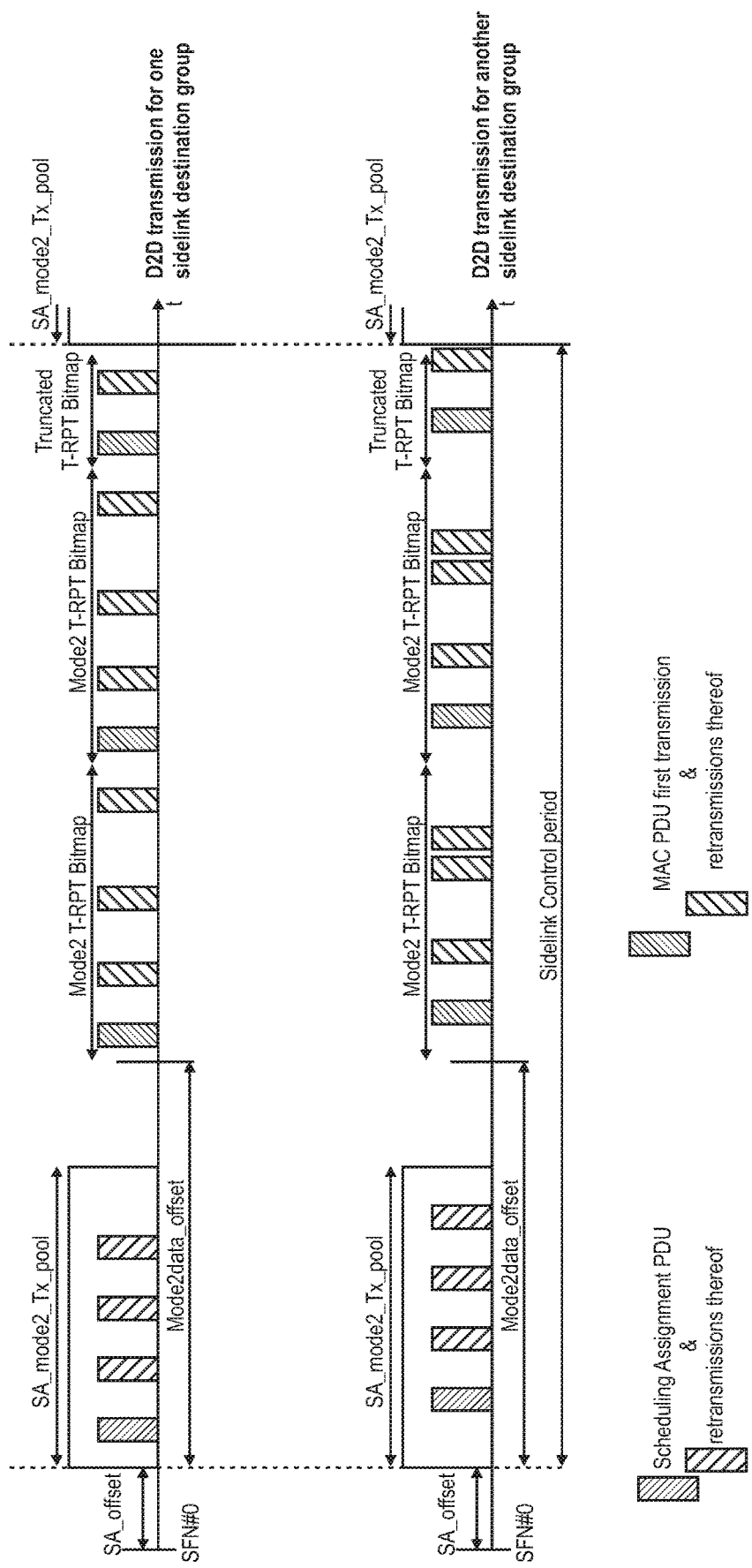
FIG. 15 illustrates the D2D communication timing for two UE-autonomously-scheduled D2D transmissions according to an implementation of the first embodiment.

FIG. 15 illustrates the D2D communication timing for a Mode 2-scheduled scenario during one SC period according to the first embodiment. FIG. 15 is based on the illustration used already in FIG. 7 of the background section. Different to the scenario of FIG. 14, no sidelink grant is received from the radio base station, rather it is assumed that the two sidelink grants are autonomously selected by the UE. As with the illustration of FIG. 14, the radio resources for transmitting the sidelink control information and the data for the two D2D transmissions are not overlapping in time. In this case, the UE selects corresponding non-overlapping resources in the time domain from the SA_mode2_Tx_pool for the transmission of the sidelink control information, and also selects appropriately different T-RPT bitmaps for the transmission of the data and transmission resources for the corresponding control information (SCI) for the two D2D transmissions.

FIG. 14 and FIG. 15 illustrate scenarios in which the available sidelink grants are all either eNodeB scheduled or autonomously selected. However, a UE may have also valid sidelink grant(s) according to Mode 1 and Mode 2 at the same time.

In the above discussed implementations of the first embodiment, it has been assumed without further detailed explanation that the UE determines the sidelink destination groups to which D2D transmissions are to be performed in the same SC period. According to specific implementations of the first embodiment, the step of determining the sidelink destination groups is performed by use of logical channel prioritization, LCP, procedure(s).

According to one alternative, one LCP procedure is performed for each sidelink grant process (or valid sidelink grant), such that the UE selects the sidelink destination group for each sidelink grant process separately from one another. As described in the background section, according to the current standard the order in which sidelink logical channels are treated is not specified and left to the implementation of the UE, i.e., the selection of the destination group and the order in which the sidelink logical channels belonging to the selected destination group are treated is not specified and not subject to some prioritization mechanism. The assumption for this implementation is however that each sidelink destination group is associated with a corresponding priority. According to this implementation, the UE would perform a LCP procedure for each sidelink grant process separately. More in particular, the UE would perform the LCP procedures sequentially, i.e., starting for example with the LCP procedure for the first sidelink grant process followed by the LCP procedure for the second sidelink grant process etc. For each LCP procedure the UE would select the sidelink destination group with the highest corresponding priority having data available. Therefore, in the case that UE has data available for transmission for two different destination groups and after having performed the first LCP procedure (according to the first sidelink grant) there is still data for the highest priority sidelink destination group in its buffer, the UE would select again the same sidelink destination group within the second LCP procedure.

According to a further alternative, a common LCP procedure is performed by the UE for all the sidelink grant processes (or valid sidelink grants), such that the UE selects the sidelink destination groups for all the sidelink grant processes in an interdependent manner. Again the assumption for this implementation is that each destination group is associated with a corresponding priority. According to this implementation, the selection of the destination groups is performed in a decreasing order of the destination group priority. In particular, assuming again that the UE has data available for transmission for two different destination groups, the first sidelink grant is used for the destination group with the highest priority among them. However the second sidelink grant is used for the destination group with the second-highest priority among them, even if there is remaining data available to be transmitted to the destination group with the highest priority among them. And so on for any further destination groups and sidelink grants.

Second Embodiment

In the following a second embodiment for solving the above problems will be described in detail. The second embodiment's main concept is different from that of the first embodiment. However, similar assumptions can be made for the scenario(s) with which the underlying principles of the second embodiment will be explained. In particular, a ProSe-enabled UE is assumed which is thus able to perform D2D transmission(s) directly with other UE(s) without the detour via the eNodeB. Furthermore, the UE shall have data destined to a plurality of sidelink destination groups available for transmission, although the improved D2D transmissions according to the second embodiment are equally applicable where data for only a single sidelink destination group is available for transmission in the UE.

According to the second embodiment, D2D transmissions are improved by enhancing the sidelink control information to be able to identify multiple sidelink destination groups, instead of only one. Correspondingly, a D2D transmission performed by a UE may carry data for multiple sidelink destination groups as identified by the corresponding sidelink control information. The radio resources for performing the D2D transmission (of the sidelink control information and the corresponding data) are defined by a sidelink grant available to the UE. In contrast to the first embodiment, the UE has only one valid sidelink grant per SC period, in a similar manner as currently defined in the 3GPP standard; thus no changes are necessary in said respect according to the second embodiment.

Moreover, the UE, which has data available for a plurality of sidelink destination groups, selects (at least two) particular sidelink destination groups from among them, and then continues to generate appropriate sidelink control information identifying the selected multiple destination groups and to generate the corresponding data packets for the D2D transmission, wherein the data packets carry data of the several determined sidelink destination groups. The UE can transmit data of different sidelink destination groups within one D2D transmission, within one SC period, where the different sidelink destination groups are identified by the sidelink control information transmitted at the beginning of the D2D transmission.

Figure 16:
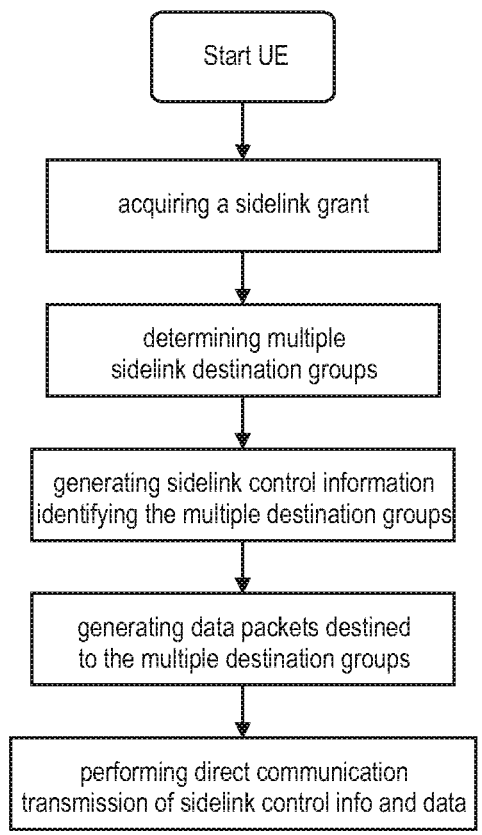
FIG. 16 illustrates a sequence diagram for the UE behavior on the transmitting side according to an implementation of the second embodiment.

FIG. 16 illustrates a sequence diagram of the UE behavior when performing a D2D transmission according to the second embodiment, including the above-mentioned steps of: acquiring a sidelink grant, determining multiple sidelink destination groups, generating sidelink control information identifying the multiple sidelink destination groups, generating data packets carrying data destined to the multiple selected sidelink destination groups and finally performing the D2D transmission of the generated sidelink control information and corresponding data destined to the multiple sidelink destination groups. Although particular order of steps is illustrated in FIG. 16 for illustration purposes, the second embodiment is not limited to this particular order, but other suitable orders are equally possible. For instance, the step of determining the various sidelink destination groups can be performed before the step of acquiring a sidelink grant; or the steps of generating sidelink control information and the data packets can be exchanged.

Figure 17:
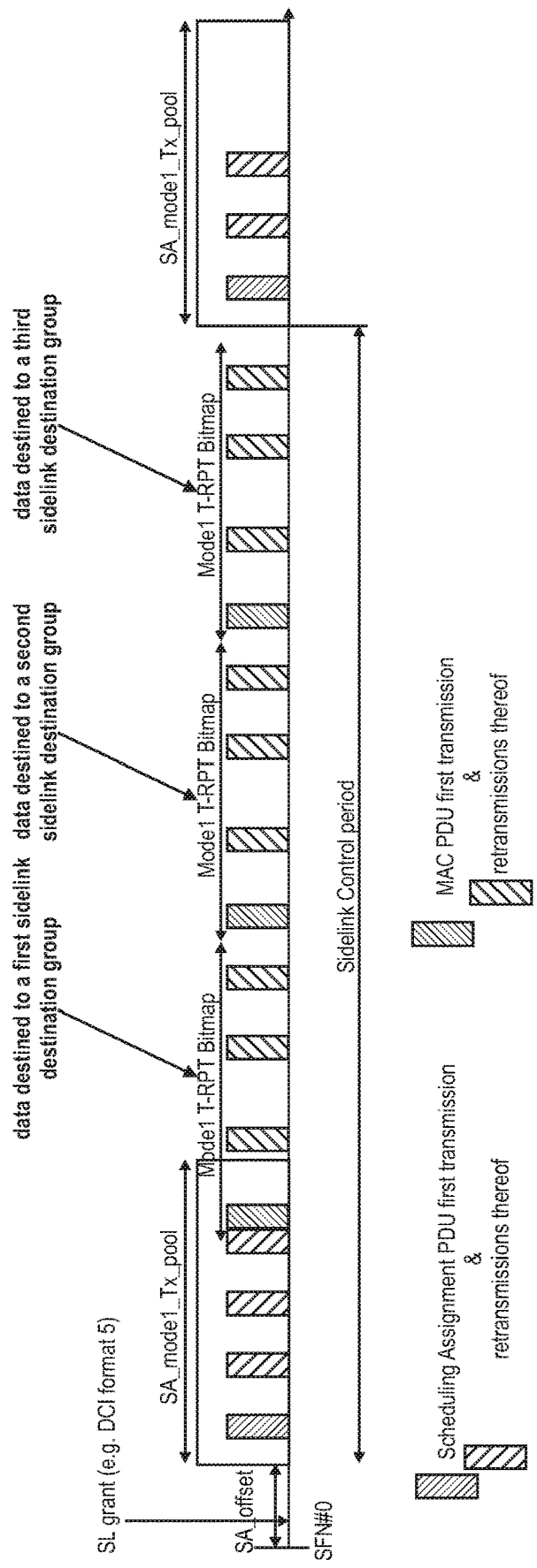
FIG. 17 illustrates the D2D communication timing for an eNB-scheduled D2D transmission carrying data for several sidelink destination groups according to an implementation of the second embodiment.

FIG. 17 in turn illustrates the D2D communication timing for a Mode1-scheduled scenario during one SC period according to the second embodiment. The exemplary illustration in FIG. 17 is based on the illustration already used in the background section according to FIG. 8. As apparent from FIG. 17, the difference is that according to the second embodiment each of the MAC PDUs (and its respective retransmissions) may carry data destined to a different sidelink destination group (in this particular example of FIG. 17 data destined to three different sidelink destination groups is transmitted within the SC period), whereas in currently standardized systems according to FIG. 8 the MAC PDUs would carry data for the same sidelink destination group (although the actual data within the various MAC PDUs would be different from one to the next). Although not depicted in FIG. 17, when assuming that the UE selected only two different sidelink destination groups for the D2D transmission, the first MAC PDU (and its retransmissions) could carry data destined to the first sidelink destination group, the second MAC PDU (and its retransmissions) could carry data destined to the second sidelink destination group, and the third MAC PDU (and its retransmissions) could carry data again destined to the first sidelink destination group, and so on.

As is also apparent from FIG. 17, the scheduling assignment (sidelink control information) transmitted at the beginning of the sidelink control period (and its retransmissions) identifies the three sidelink destination groups.

The same concept as explained for the eNB-scheduled D2D transmission scenario of FIG. 17 can be applied to a UE-scheduled D2D transmission (i.e., Mode 2).

According to different implementations of the second embodiment, the sidelink control information message may either directly identify the multiple sidelink destination groups (i.e., by including multiple corresponding IDs) or indirectly (i.e., by including one ID being in turn associated with multiple sidelink destination groups) as will be explained in detail below.

According to a first implementation of the second embodiment, the sidelink control information message transmitted as part of the D2D transmission comprises one sidelink destination group ID per determined sidelink destination group. In other words, the sidelink control information message directly identifies the sidelink destination groups by including their corresponding identifications. Correspondingly, the sidelink control information message could include two or more sidelink destination group IDs.

According to a variant of the first implementation, a new sidelink control information format (exemplarily termed in the following SCI format 1) can be defined which comprises several fields for the sidelink destination group IDs. Exemplarily, the new SCI format 1 can be based on the already standardized SCI format 0 (as defined in 3GPP TS 36.212, current version 12.4.0, subclause 5.4.3.1.1), but additionally allowing for several sidelink destination group IDs (termed in the standard, "group destination ID"). In more detail, new SCI format 1 would thus include, in correspondence with the already standardized SCI format 0 of TS 36.212, one or more of the following fields:

frequency hopping flag
resource block assignment and hopping resource allocation
time resource pattern
modulation and coding scheme
timing advance indication For example, instead of providing 8 bits for the group destination ID as in the currently standardized SCI format 0, the new SCI format 1 would have 16 bits available so as to include two group destination IDs (i.e., corresponding to the two sidelink destination group IDs). Of course, if sidelink control information messages should be able to carry even more sidelink destination group IDs, more bits have to be provided in said respect (e.g., 24 bits for 3 different sidelink destination group IDs, 32 bits for 4 different sidelink destination group IDs etc.).

Optionally to this first implementation of the second embodiment, the receiving UE shall be aware to which sidelink destination group ID the corresponding transport blocks in the D2D transmission refer; put differently, the receiving UE shall know which of the transport blocks carries data of which sidelink destination group identified in the SCI. This could be exemplarily done by a predetermined unambiguous relationship (i.e., a rule) between the order of the sidelink destination group IDs in the SCI and the order of the corresponding transport blocks in the subsequent part of the D2D transmission. For instance, the order of the (multiple) group destination IDs (i.e., the sidelink destination group IDs) within the SCI may correspond to the order of the corresponding transport blocks (i.e., transport blocks carrying data for the respective sidelink destination groups) as transmitted in the D2D transmission. For example, when the first group destination ID in the SCI points to destination A and the second group destination ID points to destination B, then, in case there are two transport blocks transmitted within the SC period, the first transport block contains data destined to group A and the second transport block contains data destined to group B. In case there would be three transport blocks transmitted within the SC period, the third transport block would for example contain again data destined to group A, and so on. Essentially, a receiving UE is according to some predefined rule aware of the group destination IDs of the corresponding transport blocks within a SCI period. When implementing same in the currently-specified 3GPP environment, a receiving UE knows, based on the group destination IDs within the SCI and the pre-defined rules, the 8 least significant bits (LSBs) of the Destination Layer-2 ID(s) of the data within the transport blocks. Consequently, the UE can filter the D2D transmission, particularly the MAC PDUs, depending on the sidelink destination group for which it is interested such that the receiving UE only decodes those MAC PDUs that contain data of sidelink destination groups that it is indeed interested in. More in detail, if the DST field of the decoded MAC PDU subheader is equal to the 16 MSB of any of the Destination Layer-2 ID(s) of the UE, the PDU will be further processed in the UE.

According to some alternative implementation, the DST field of the MAC PDU subheader contains the 24 MSB, e.g., the complete 24 bits, of the Destination Layer-2 ID. Based on these 24bits in the MAC subheader, a receiving UE can unambiguously identify the Destination Layer-2 ID of the data in a transport block and thus perform the MAC filtering. In this case, the order of the group destination IDs within the SCI does not need to correspond to the order of the corresponding transport blocks as transmitted in the D2D transmission. For example, even if the first group destination ID points to destination A and the second group destination ID points to destination B, then in case there are two transport blocks transmitted within the SC period, the first transport block could contain data destined to group B and the second transport block contains data destined to group A. Based on the 24bits Destination Layer-2 ID within the MAC PDU subheader, a receiving UE could unambiguously perform the filtering, i.e., decode only those packets which the receiving UE is interested in based on the Destination Layer-2 ID.

According to a second alternative implementation of the second embodiment, the sidelink control information message transmitted as part of the D2D transmission comprises only a single ID, which in turn however is associated with the multiple determined sidelink destination groups. Consequently, instead of directly identifying the sidelink destination groups by including their corresponding identifications, the sidelink destination groups are indirectly identified by a suitable ID which at the receiver side can be associated again to the multiple sidelink destination groups.

In particular, the second alternative implementation introduces a new ID, which is transmitted instead of the sidelink destination group ID and which is associated with multiple sidelink destination groups. Put differently, this new ID, exemplarily termed in the following Broadcast ID, groups various sidelink destination groups together according to a Many-to-one mapping such that one Broadcast ID is associated with at least two different sidelink destination groups. This new mapping function can be performed by a suitable node in the core network, for instance the ProSe server function. Accordingly, the ProSe server function can perform such a mapping function so as to associate several sidelink destination groups to each Broadcast ID. The corresponding mapping information, i.e., the Broadcast IDs and corresponding associated sidelink destination groups, is then provided to the UEs, and optionally also to the eNodeBs. The provision of this information can be for example performed using RRC signaling, or being broadcast in the system information by the various eNodeBs.

In one variant, this new Broadcast ID is of the same size as the sidelink destination group ID normally used to identify sidelink destination group in the sidelink control information, i.e., 8 bits (see background section) such that the already defined sidelink control information format 0 can be reused without adaptation. Alternatively, the new broadcast ID can be of a different size, e.g., larger, than a normally used sidelink destination group ID, in which case a new sidelink control information format is needed to carry same.

Based on the second alternative implementation of the second embodiment, the UE, after determining the multiple sidelink destination groups for which data is to be transmitted in the D2D transmission according to the valid sidelink grant, needs to also determine a corresponding Broadcast ID that is associated to those multiple determined sidelink destination groups. The UE then can include the determined Broadcast ID into the sidelink control information of the D2D transmission, instead of including one or the multiple IDs of the sidelink destination groups.

In turn, UEs that receive the D2D transmission comprising the sidelink control information with the Broadcast ID determine the multiple sidelink destination groups from the received Broadcast ID and based on stored mapping information previously received from, e.g., the ProSe server function.

According to a variant, in order to allow backwards compatibility particularly in the case where the Broadcast ID has the same size as the previously used ID of a sidelink destination group carried in a sidelink control information message, the sidelink control information message can include appropriate information (such as a flag) as to whether the sidelink control information message comprises the new Broadcast ID or a normal sidelink destination group ID. This may necessitate a new sidelink control information format which additionally includes that flag. Correspondingly, a transmitting UE sets a corresponding flag value depending on whether it includes a Broadcast ID (when data of several sidelink destination groups is to be transmitted within the D2D transmission) or a normal sidelink destination group ID (when data of only one sidelink destination group is to be transmitted within the D2 the transmission). In turn, a receiving UE takes this flag value into account when determining to which sidelink destination group(s) the received D2D is actually destined.

In the above, two alternative implementations of the second embodiment have been described respectively allowing sidelink control information to identify multiple sidelink destination groups when necessary.

Correspondingly, a UE which has data available for transmission for several sidelink destination groups determines for which of those multiple sidelink destination groups data shall be transmitted with the next D2D transmission. The corresponding sidelink control information message is then generated so as to identify the determined multiple sidelink destination groups; be it by including several IDs according to the first alternative implementation described above, or by including a single suitable Broadcast ID according to the second alternative implementation described above.

Moreover, a UE generates the corresponding data packets (i.e., MAC PDUs) destined to the multiple sidelink destination groups for transmission as part of the D2D transmission within the SC period. For instance, the first transport block (MAC PDU) generated by the UE for the SC period could carry data destined for a first sidelink destination group, the second transport block generated by the UE within the SC period could carry data destined for a second sidelink destination group and so on. This is readily apparent from the illustration in FIG. 17.

However, it should be noted, that the number of sidelink destination groups for which data can be transmitted by a D2D transmission within one SC period also depends on the length of the SC period and/or the T-RPT patterns given by the sidelink grant. For example, in the exemplary scenario of FIG. 17, the length of the sidelink control period in combination with the selected T-RPT bitmaps allows for three separate MAC PDUs to be transmitted within one SC period such that at most data destined for three sidelink destination groups can be transmitted by the UE. When configuring a different length of the SC period or selecting different T-RPT patterns (e.g., with less repetitions) more or less sidelink destination groups can be determined for being transmitted within one SC period.

Although in the above example (three) different destination groups are determined by the UE for which data shall be transmitted with the D2D transmission, also the same destination group(s) can be respectively selected by the UE.

Further details of the various steps performed by the UE so as to successfully perform a D2D transmission are omitted from here, and rather reference is made to the respective passages in the background section.

A corresponding operation on the receiving side allows reception of the D2D transmission with data destined to several sidelink destination groups. A receiving UE identifies the several sidelink destination groups from the sidelink control information message (Group destination ID) and can thus decide whether it is interested in the D2D transmission or not, i.e., whether the UE is interested in receiving data for one or more of the sidelink destination groups identified by the identifier in the SCI therein. If the UE is interested, the corresponding data within the D2D transmission is received and decoded in an appropriate manner by the receiving UE. This may include that the receiving UE determines the sidelink destination group of each of the MAC PDUs of the D2D transmission so as to decide whether it wants to receive and decode the data within the MAC PDU or not.

According to the currently standardized procedure for transmitting MAC PDUs in a sidelink D2D transmission as defined, e.g., by the 3GPP technical standard 36.321, current version 12.5.0, subclause 6.2.4, a MAC header includes information on the sidelink destination group of the data which is included. In particular, in the field "DST" of the MAC header the 16 most significant bits of the Destination Layer-2 ID are transmitted by which the receiving UE can identify the sidelink destination group. The SCI message, as currently standardized comprises the 8 LSB of the Destination Layer2-ID, which then in combination with the 16MSB within the MAC header, allows the receiving UE to unambiguously identify the sidelink destination group (i.e., the Destination Layer-2 ID). Consequently, the UE can filter the D2D transmission, particularly the MAC PDUs, depending on the sidelink destination group for which it is interested such that the receiving UE only decodes those MAC PDUs that contain data of sidelink destination groups that is indeed interested in. More in detail, if the DST field of the decoded MAC PDU subheader is equal to the 16 MSB of any of the Destination Layer-2 ID(s) of the UE, the PDU will be further processed in the UE.

According to an implementation, the DST field of the MAC PDU subheader contains the 24 MSB, e.g., the complete 24 bits, of the Destination Layer-2 ID, instead of only the 16 MSB of the Destination Layer-2 ID as currently standardized. Based on these 24bits in the MAC subheader, a receiving UE can unambiguously identify the Destination Layer-2 ID of the data in a transport block and thus perform the MAC filtering. This would be advantageous in particular for the second embodiment described above where several Group destination IDs are mapped to one Broadcast ID, since a receiving UE would not know the Group destination ID, i.e., 8 LSB of the Destination Layer-2 ID of the corresponding transport blocks within a SC period. It would basically only know based on the Broadcast ID that the transport blocks within the SC period could contain data destined to one of the Group destination IDs mapped to the Broadcast ID. For example in case Group Destination ID='0' and Group Destination ID='1' is mapped to Broadcast ID='0' then a receiving UE does not know whether the first transport block within the SC period has the Group Destination ID='0' or Group Destination ID='1.' Same applies for the other transport blocks within the SC period. Since according to the current standard the DST field in the MAC PDU subheader only contains the 16MSB of the Destination Layer-2 ID, a receiving UE cannot unambiguously identify the complete Destination Layer-2 ID of the data of a transport block (since it does not know the 8LSB of the Destination Layer-2 ID (Group destination ID)).

In the above description of the second embodiment, it was assumed that the UE has a valid sidelink grant without discussing any further details as to how the UE acquired same. For the operation of the UE according to the principles of the second embodiment, it is not important whether the UE acquired the sidelink grant according to Mode 1 (from the eNB) or Mode 2 (R2 anonymously selected by UE). Correspondingly, the second embodiment is applicable to both Mode1-acquired sidelink grants and Mode2-acquired sidelink grants. In particular, in case of Mode 1, the sidelink grant was received from the eNodeB, e.g., based on a corresponding request from the UE, for instance a scheduling request or RACH procedure with corresponding buffer status information as an explained in the background section. Details on these procedures and also on the corresponding sidelink scheduling message transmitted from the eNodeB to the UE, are omitted here and rather reference is made to the corresponding passages of the background section. In case of Mode 2, the sidelink grant is autonomously selected by the UE from corresponding transmission radio resource pools for transmission of scheduling control information and data. Again, details on these procedures for Mode 2 are omitted here and rather reference is made to the corresponding passages of the background section.

In the above discussed implementations of the second embodiment, it was described that the UE determines the multiple sidelink destination groups to which the D2D transmission is to be performed within the SC period without giving any further details. According to specific implementations of the second embodiment, the step of determining the multiple sidelink destination groups can be performed by the UE by use of logical channel prioritization, LCP, procedure(s). In particular, during the LCP procedure the UE can determine for which sidelink destination groups data is to be transmitted.

According to an alternative to the second embodiment, a UE would be allowed to transmit data to different sidelink destination groups as long as the corresponding group destination ID (which is transmitted in the SCI) is the same. More in particular, according to the current standard, the Group destination ID which is transmitted in the SCI on the physical sidelink control channel is the 8 least significant bits (LSB) of the Destination Layer-2 ID. As long as the UE multiplexes logical channels within a PDU of Source Layer-2 ID-Destination Layer-2 ID pairs where the 8LSB of the Destination Layer-2 ID is the same, the UE is allowed to transmit data to different sidelink destination groups within one SC period. This implementation actually requires no change of the currently-standardized procedure. Since the Group Destination ID will be the same, the interested receiving UEs will not miss the corresponding data transmissions on the SL-DCH. As an example, a transmitting UE could transmit within one SC period data which is destined to the Destination Layer-2 ID='111111111111111000000000' as well as to the sidelink destination group with Destination Layer-2 ID='111111111111111100000000,' since the 8 LSB are the same for both cases (Group Destination ID transmitted in the SCI would be '00000000' in this case).

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication system, comprising:
a base station, which, in operation, generates and transmits sidelink grants; and
a user equipment including:
  a receiver, which, in operation, receives the sidelink grants from the base station;
  circuitry, which is coupled to the receiver and which, in operation:
    associates the sidelink grants with sidelink processes, which are respectively associated with identifications (IDs);
    determines radio resources allocated to the sidelink grants;
    uses a logical channel prioritization (LCP) procedure in common for all the sidelink grants to select one sidelink destination group including a logical channel associated with a highest priority, out of a plurality of sidelink destination groups including logical channels having data available for transmission and not previously selected within one transmission control period, as a destination of one of a plurality of direct communication transmissions; and
    generates sidelink control information that identifies the selected destination group and that identifies the radio resource allocated to the corresponding sidelink grant; and
  a transmitter, which is coupled to the circuitry and which, in operation, performs the plurality of direct communication transmissions including the direct communication transmission destined to the selected sidelink destination group, wherein the plurality of direct communication transmissions of sidelink control information and data over a plurality of direct sidelink connections use the sidelink grants for the sidelink processes, respectively, within said one transmission control period, wherein a maximum number of the sidelink processes executable in parallel is configured for the user equipment by the base station;
  wherein the sidelink grants indicate time resource patterns, which define radio resources in a time domain, with different bitmap patterns between the plurality of direct communication transmissions.

2. The communication system according to claim 1, wherein the transmitter of the user equipment, in operation, transmits the data using a next uplink subframe after an uplink subframe used to transmit the sidelink control information.

3. The communication system according to claim 1, wherein the maximum number of the sidelink processes executable in parallel is 8.

4. The communication system according to claim 1, wherein the identification (ID) is a destination group ID that identifies a sidelink destination group of a corresponding one of the plurality of direct communication transmissions.

5. A method performed by a communication system including at least a user equipment and a base station, the method comprising:
generating, by the base station, sidelink grants;
transmitting, by the base station, the sidelink grants;
receiving, by the user equipment, the sidelink grants;

associating, by the user equipment, the sidelink grants with sidelink processes, which are respectively associated with identifications (IDs);

determining, by the user equipment, radio resources allocated to the sidelink grants;

using, by the user equipment, a logical channel prioritization (LCP) procedure in common for all the sidelink grants to select one sidelink destination group including a logical channel associated with a highest priority, out of a plurality of sidelink destination groups including logical channels having data available for transmission and not previously selected within one transmission control period, as a destination of one of a plurality of direct communication transmissions;

generating, by the user equipment, sidelink control information that identifies the selected destination group and that identifies the radio resource allocated to the corresponding sidelink grant; and performing, by the user equipment, the plurality of direct communication transmissions including the direct communication transmission destined to the selected sidelink destination group, wherein the plurality of direct communication transmissions of sidelink control information and data over a plurality of direct sidelink connections use the sidelink grants for the sidelink processes, respectively, within one transmission control period, wherein a maximum number of the sidelink processes executable in parallel is configured for the user equipment by the base station;

wherein the sidelink grants indicate time resource patterns, which define radio resources in a time domain, with different bitmap patterns between the plurality of direct communication transmissions.

6. The method according to claim 5, comprising:

transmitting, by the user equipment, the data using a next uplink subframe after an uplink subframe used to transmit the sidelink control information.

7. The method according to claim 5, wherein the maximum number of the sidelink processes executable in parallel is 8.

8. The method according to claim 5, wherein the identification (ID) is a destination group ID that identifies a sidelink destination group of a corresponding one of the plurality of direct communication transmissions.

\* \* \* \* \*